US009660818B2

United States Patent
Castro Castro et al.

(10) Patent No.: US 9,660,818 B2
(45) Date of Patent: May 23, 2017

(54) ADVANCED SERVICE-AWARE POLICY AND CHARGING CONTROL METHODS, NETWORK NODES, AND COMPUTER PROGRAMS

(75) Inventors: Fabian Castro Castro, Madrid (ES); Susana Fernandez Alonso, Madrid (ES); David Shrader, Wilton Manors, FL (US)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/423,356

(22) PCT Filed: Aug. 27, 2012

(86) PCT No.: PCT/EP2012/066583
§ 371 (c)(1),
(2), (4) Date: Feb. 23, 2015

(87) PCT Pub. No.: WO2014/032691
PCT Pub. Date: Mar. 6, 2014

(65) Prior Publication Data
US 2015/0236862 A1    Aug. 20, 2015

(51) Int. Cl.
*H04L 12/14* (2006.01)
*H04L 12/26* (2006.01)
*H04L 12/24* (2006.01)

(52) U.S. Cl.
CPC ...... *H04L 12/1407* (2013.01); *H04L 41/5032* (2013.01); *H04L 43/0876* (2013.01)

(58) Field of Classification Search
CPC . H04L 12/14; H04L 12/1403; H04L 12/1407; H04L 12/1419; H04L 12/1442; H04L 12/2476; H04L 12/2623; H04L 12/2823; H04L 12/44; H04L 43/0876; H04L 43/06; H04L 41/5032; H04L 41/06
See application file for complete search history.

(56) References Cited

U.S. PATENT DOCUMENTS 5,640,505 A * 6/1997 Hearn .................. G06Q 10/087
                                                         379/114.01
8,908,521 B2 * 12/2014 Dyke .................. H04L 67/1002
                                                         370/235
(Continued)

FOREIGN PATENT DOCUMENTS

EP    2 458 779 A1    5/2012

OTHER PUBLICATIONS

International Search Report and Written Opinion dated Feb. 20, 2013 for International Application Serial No. PCT/IB2012/066583, International Filing Date—Aug. 27, 2012 consisting of 14-pages.
(Continued)

*Primary Examiner* — Warner Wong
(74) *Attorney, Agent, or Firm* — Christopher & Weisburg, P.A.

(57) ABSTRACT

In a method carried out in a telecommunication network, a policy decision function provides an instruction to a policy enforcement function and/or a traffic detection function. Within the instruction, some service instances of a service are identified by the order according to which the service instances are started. The instruction also indicates: (i) a service instance level reporting rule according to which the policy enforcement function and/or traffic detection function should report, or should not report, information to the policy decision function after occurrence of an event relating to any one of the identified service instances; and/or (ii) a service instance level enforcement rule that the policy enforcement function and/or traffic detection function should enforce on a received packet relating to any one of the identified service instances. The invention also relates to network nodes and computer programs.

20 Claims, 17 Drawing Sheets

(56) References Cited

U.S. PATENT DOCUMENTS

| | | | | |
|---|---|---|---|---|
| 2006/0171509 A1* | 8/2006 | Berthaud | ............... | G06Q 30/02 379/1.04 |
| 2008/0046266 A1* | 2/2008 | Gudipalley | ............ | G06Q 10/00 370/230 |
| 2011/0145895 A1* | 6/2011 | Zhang | .................... | H04L 47/10 726/4 |
| 2012/0136992 A1* | 5/2012 | Lopez Nieto | ....... | H04L 12/1407 709/224 |
| 2014/0230006 A1* | 8/2014 | Burke | .................... | H04L 63/20 726/1 |

OTHER PUBLICATIONS

International Preliminary Report on Patentability dated Sep. 12, 2014 for International Application Serial No. PCT/IB2012/066583, International Filing Date—Aug. 27, 2012 consisting of 14-pages.
Ericsson et al.: "Correction for Application Instance Identifiers", 3GPP Draft; S2-114778, Change Request: 23.203 CR 0600, Source to TSG: SA WG2, Work Item Code: SAPP, XP050575216, [retrieved on Nov. 7, 2011], 3rd Generation Partnership Project (3GPP), Mobile Competence Centre ; 650, Route Des Lucioles; F-06921 Sophia-Antipolis Cedex; France, San Francisco, USA; Nov. 7, 2011 consisting of 6-pages.
A. Dalela and M. Hammer; Cisco Systems: "Service Orchestration Protocol (SOP) Requirements; draft-dalela-orchestration-00.txt", Network Working Group, Internet Draft, Intended status: Informational, Expires Jul. 2012, pp. 1-28, XP015079976, [retrieved on Jan. 4, 2012 by EPO] Jan. 4, 2012 consisting of 28-pages.
3GPP_TS_23203 V11.6.0 (Jun. 2012) 3rd Generation Partnership Project; Technical Specification Group Services and System Aspects; Policy and charging control architecture (Release 11) Jun. 15, 2012 consisting of 177-pages.
3GPP TS 29.212 V11.5.0 (Jun. 2012) 3rd Generation Partnership Project; Technical Specification Group Core Network and Terminals; Policy and Charging Control (PCC) over Gx/Sd reference point (Release 11) Jun. 28, 2012 consisting of 194-pages.

* cited by examiner

US 9,660,818 B2

ADVANCED SERVICE-AWARE POLICY AND CHARGING CONTROL METHODS, NETWORK NODES, AND COMPUTER PROGRAMS

TECHNICAL FIELD

The present invention relates to methods carried out in a telecommunication network involving network nodes such as a policy decision function, a policy enforcement function and/or a traffic detection function (TDF). The invention also relates to network nodes hosting such functions. The invention further relates to computer program products and computer programs comprising computer-readable instructions configured for carrying out the above-mentioned methods.

BACKGROUND

In communication networks, such as telecommunication networks, a call or a service often involves, on the one hand, a control plane or signalling plane and, on the other hand, a user plane, media plane or traffic plane. The control plane or signalling plane is in charge of establishing and managing a connection between two points on the network. The user plane, media plane or traffic plane is in charge of transporting the user data.

In this context, network operators often want to define and enforce a set of rules in the network. A set of rules constitutes policies. A policy framework for managing and enforcing these policies usually includes at least three elements, or functions: a policy repository for storing the policy rules, which may be user-specific, a policy decision element, function or point, and a policy enforcement element, function or point. The purposes of a policy framework include controlling subscriber access to the networks and services.

A policy framework notably addresses the decisions as to whether the subscriber, i.e. the user, is entitled, or authorized, to enjoy a service, and whether the network can provide the service to the subscriber (and, possibly, with which quality of service).

Policy and charging control (PCC) architectures, such as, but not limited to, the architecture described in "3GPP TS 23.203 V11.6.0 (2012-June); *Technical Specification; 3rd Generation Partnership Project; Technical Specification Group Services and System Aspects; Policy and charging control architecture (Release 11)*" (available on http://www.3gpp.org/ftp/Specs/html-info/23203.htm) (hereinafter referred to as "reference [1]"), integrate the policy and charging control.

In such a FCC architecture, a policy and charging rules function (PCRF) is a functional entity in charge of deciding charging, policies and quality of service (QoS) for services of a given user. The PCRF may for example decide the quality of the connection to be allocated for voice, video, etc., which results, for example, on the establishment of dedicated bearer(s) with guaranteed bit rate (GBR) or non-guaranteed bit rate (non GBR). The PCRF may also make decisions about packet forwarding treatment in the radio access network (RAN) by means of determining the QoS class identifier (QCI). The PCRF may also decide, at the packet core control plane, the priority of a bearer to be established over other bearers, for the same or different users, by providing allocation and retention priority (ARP) information. Based on the above decisions by the PCRF, PCC rules may be generated and then installed in a policy and charging enforcement function (PCEF) of the PCC architecture, so that each service is given the appropriate treatment that the service requires.

A TDF has been introduced in 3GPP specifications (Release 11) to cope with what is referred hereafter as "service awareness" functionalities. In other words, the need for a TDF stems from the insight that the operator of a telecommunications network might be interested in having specific policies with regard to data traffic relating to certain services that can be initiated or terminated by UEs of its subscribers, so as to e.g. enforce specific charging and/or QoS policies in respect to data flows relating to said services. A TDF is described for example in reference [1], sections 4.5 and 6.2.9.

How a PCRF may communicate with a PCEF and/or a TDF, for example via the so-called "Gx" and "Sd" interfaces, is for example described in "3GPP TS 29.212 V11.5.0 (2012-June); *Technical Specification; 3rd Generation Partnership Project; Technical Specification Group Core Network and Terminals; Policy and Charging Control (PCC) over Gx/Sd reference point (Release 11)*" (hereinafter referred to as "reference [2]").

The background also includes European patent application EP 2 458 779 A1 (hereinafter referred to as "reference [3]" or "ref. [3]"), which relates to a PCC method enabling to monitor network resources usage on a per service instance basis, In one embodiment of ref. [3], a PCRF provides identification information for identifying a particular service instance of a particular service type to a PCEF to enable the PCEF to detect which of the received packets are associated with the service instance, so that a usage parameter can be updated. A usage limit may also be provided by the PCRF to the PCEF to enable the PCEF to decide when to report the usage parameter to the PCRF (ref. [3], paragraphs [0018] and [0044]). The identification information for identifying a particular service instance may be used to identify a particular (promoted) movie (ref. [3], paragraphs [0050], [0055], [0068], [0118], and [0137]).

It is desirable to provide methods and devices to improve PCC architectures and implementations, notably to provide more flexibility for operators in the manner according to which subscriber accesses may be controlled. There is also a constant need to keep the amount of network signalling as low as possible and even, if possible, to reduce the amount of network signalling involved.

SUMMARY

To meet or at least partially meet the above-mentioned goals, methods, network nodes, computer programs and computer program products according to the invention are defined in the independent claims. Particular embodiments are defined in the dependent claims.

In one embodiment, a method is carried out by a policy decision function (such as for example a PCRF) in a telecommunication network. The method comprises a providing procedure for providing, to at least one of a policy enforcement function (such as for example a PCEF) and a TDF, an instruction. The instruction identifies at least one service instance of a service. Within the instruction, the at least one service instance is, or are, identified by the order according to which the at least one service instance has been, have been, or may be started (hereinafter referred to as the "starting order" of the service instance). The instruction also indicates at least one of: (i) a reporting rule, hereinafter referred to as "service instance level reporting rule", according to which the at least one of a policy enforcement function and a TDF should report, or should not report, information to the policy decision function after occurrence of an event relating to any one of the identified at least one service instance; and (ii) an enforcement rule, hereinafter referred to as "service instance level enforcement rule", that the at least one of a policy enforcement function and a TDF should enforce on a received packet relating to any one of the identified at least one service instance, Thus, an instruction may indicate a service instance level reporting rule (case "(i)"), may indicate a service instance level enforcement rule (case "(ii)"), or may indicate both a service instance level reporting rule and a service instance level enforcement rule (case "(i) (ii)"). Thus, three alternative solutions are provided.

The method enables to reduce signalling sent to the policy decision function. Indeed, the method enables the policy decision function to request that the policy enforcement function and/or the TDF reports information (to the policy decision function) according to precise reporting rules defined on a per service instance basis. in particular, a service instance level reporting rule is defined with respect to one or more service instance identified by their starting order, i.e. by the order according to which the service instance(s) have been or may be started.

This means that, instead of receiving report information regarding the occurrence of a particular type of event no matter to which service instance the event relates, the policy decision function may for example request to receive information regarding the occurrence of an event only if the service instance to which the event relates is, let's say, the tenth service instance of the service or more. The policy decision function may therefore receive precise report information without being flooded by a constant flow of notifications which the policy decision function may, to a large extent, not actually use.

In other words, a beneficial, fine-grained reporting is provided at the service instance level, while at the same time not requiring reporting to be carried out in the same manner for all the service instances. When providing an instruction to the policy enforcement function and/or TDF, the policy decision function distinguishes service instance(s), and the reporting associated therewith, by their starting order. In this context, the service instances, and the reporting associated therewith, are not distinguished, or at least not only distinguished, by the content or nature of a service instance. The same applies to the enforcement.

A reporting rule and/or enforcement rule indicated by an instruction may apply to one service instance which already exists, to a plurality of service instances which all already exist, to a service instance which does not exist yet but may exist in the future, to a plurality of service instances which do not exist yet but may exist in the future, or to a plurality of service instances among which one or more service instances already exist and one or more service instances do not exist yet. In other words, the instruction may be sent in advance of the (potential) existence of the service instance(s) to which the reporting rule(s) and enforcement rule(s) apply.

In above-mentioned case "(i)" (instruction indicating a service instance level reporting rule), a service instance level reporting rule applies to at least one service instance of a service but not to all service instances of the service. Indeed, the purpose of the method is to enable the policy decision function to request a different reporting to be carried out by the policy enforcement function and/or a TDF depending on the starting order of the service instances.

Likewise, in above-mentioned case "(ii)" (instruction indicating a service instance level enforcement rule), a service instance level enforcement rule applies to at least one service instance of a service but not to all service instances of the service. This enables the policy decision function to request a different enforcement to be carried out by the policy enforcement function and/or a TDF depending on the starting order of the service instances.

In above-mentioned case "(i) (ii)" (instruction indicating both a service instance level reporting rule and a service instance level enforcement rule), at least one of the service instance level reporting rule and the service instance level enforcement rule does not apply in the same manner to all service instances of the service.

There may be more than one service instance level reporting rule in an instruction. For each service instance level reporting rule, the instruction identifies one or more service instances to which the service instance level reporting rule applies. Similarly, there may be more than one service instance level enforcement rule. For each service instance level enforcement rule, the instruction identifies one or more service instances to which the service instance level enforcement rule applies. In one embodiment, a plurality of service instance level reporting rules indicated in an instruction apply to non-overlapping groups of service instance(s) so as to avoid conflicts between contradictory service instance level reporting rules. However, if two or more service instance level reporting rules are not conflicting because they are not contradictory, they may apply to overlapping groups of service instance(s). The same considerations apply to service instance level enforcement rules.

In one embodiment, the starting order of a service instance is defined by its instantaneous order compared to all the concurrent service instances of a service for a particular user, therefore excluding any terminated service instance, when computing the starting order. In such a case, the starting order of a service instance may change as earlier service instances are terminated.

In one embodiment, the starting order of a service instance is defined by its absolute order compared to all the service instances (i.e., all the service instances of a particular service for a particular user) which have been started during a time period, no matter whether a service instance has already been terminated or is still active. In such a case, the starting order of a service instance should not change during the time period.

In one embodiment, the instruction further indicates a reporting rule, hereinafter referred to as "service level reporting rule", according to which the at least one of a policy enforcement function and a TDF should report, or should not report, information to the policy decision function after occurrence of an event relating to the service, in case there is no service instance level reporting rule applicable to the service instance to which the event relates.

In this embodiment, the policy decision function is therefore not required to exhaustively provide service instance level reporting rules for all possible starting orders of a service instance. A service level reporting rule may therefore act as a default rule easing the communication of an instruction between the policy decision function and the policy enforcement function and/or TDF.

In one embodiment, the instruction further indicates a reporting rule, hereinafter referred to as "default bearer reporting rule", according to which the at least one of a policy enforcement function and a TDF should report, or should not report, information to the policy decision function after occurrence of an event relating to a user terminal's connection, in case there is neither a service instance level reporting rule applicable to the service instance to which the event relates nor a service level reporting rule applicable to the service to which the event relates.

This embodiment provides a further default mechanism further easing the communication of an instruction from the policy decision function to the policy enforcement function and/or TDF.

In one embodiment, the instruction further indicates an enforcement rule, hereinafter referred to as "service level enforcement rule", that the at least one of a policy enforcement function and a TDF should enforce on a received packet relating to the service, in case there is no service instance level enforcement rule applicable to the service instance to which the received packet relates.

This embodiment is also beneficial in that service instance level enforcement rules need not be defined exhaustively for all possible starting orders of a service instance, The communication of an instruction between the policy decision function and the policy enforcement function and/or TDF is therefore eased.

In one embodiment, the instruction further indicates an enforcement rule, hereinafter referred to as "default bearer enforcement rule", that the at least one of a policy enforcement function and a TDF should enforce on a received packet relating to a connection of a user terminal from which the received packet originates or to which the received packet is destined, in case there is neither a service instance level enforcement rule applicable to the service instance to which the received packet relates nor a service level enforcement rule applicable to the service to which the received packet relates.

This embodiment further eases the construction of the instruction and the communication thereof from the policy decision function to the policy enforcement function and/or TDF.

In one embodiment, the providing procedure is such that the instruction indicates that, for a first set of at least one service instance of a service, a first service instance level reporting rule applies, and, for a second set of at least one another service instance of the service, a second service instance level reporting rule applies, wherein the first service instance level reporting rule differs from the second service instance level reporting rule.

In one embodiment, the providing procedure is such that the instruction indicates that, for a first set of at least one service instance of a service, a first service instance level enforcement rule applies, whereas for a second set of at least one another service instance of the service, a second service instance level enforcement rule applies, wherein the first service instance level enforcement rule differs from the second service instance level enforcement rule.

In one embodiment involving two sets of service instance(s) of a particular service (i.e., any of the two embodiments just mentioned above), let us consider that n is an integer value such that n>1, with n indicating a number of service instances of the service (for a particular user). Let us further consider that i is an integer value such that $1 \leq i \leq n$, with a different value of i being associated with each of the n service instances, the value i corresponding to the order according to which a service instance has been or may be started (i.e., the starting order of the service instance) in the sense that, if the value i associated with a first service instance is smaller than the value i associated with a second service instance, it means that the first service instance has been or may be started before the second service instance. In this embodiment, the first set comprises the service instance(s) associated with values i=a to i=b, and the second set comprises the service instance(s) associated with values i=c to i=d, wherein $a \geq 1$; $a \leq b$; $b < c$; $c \leq d$; and $d \leq n$.

In this embodiment, a first service instance level reporting rule and/or first service instance level enforcement rule is (or are) applied to the first set of service instance(s) with values i=a to i=b, whereas a second service instance level reporting rule and/or a second service instance level enforcement rule is applied to a second set of service instance(s) with values i=c to i=d. The reporting and/or enforcement will therefore be different for the two sets of service instance(s). This enables the policy decision function to request, in an efficient manner, a differentiation on a per service instance basis according to the starting order of the service instances.

In particular, in a sub-embodiment, at least one of the following applies: (i) $a < b$ and $c \leq d$; (ii) $a \leq b$ and $c < d$; and (iii) $a < b$ and $c < d$. In other words, in this sub-embodiment, any one or both of the first set of service instance(s) and the second set of service instance(s) may be constituted by a range of starting orders, i.e. a range of service instances. For example, in a sub-embodiment, a=b=1; c=2; and d=n.

Any of the above-mentioned embodiments and sub-embodiments involving the integer n may be modified by assigning to n the value $\infty$ (i.e., infinity) instead of an integer value. in other words, in these modified embodiments, n represents an unbound limit so that the second range of service instances comprises all service instances with $i \geq c$.

In one embodiment, the event is at least one of: (i) an initiation (i.e., an activation) of a service instance; (ii) a modification of a property of a service instance; (iii) a termination of a service instance; and (iv) a situation wherein an accumulated usage associated with a service instance has reached or exceeded a threshold.

In one embodiment, the service instance level enforcement rule relates to at least one of: (i) whether to enable or disable the forwarding of received packets; (ii) whether to enable or disable the forwarding of received packets in the uplink direction; (iii) whether to enable or disable the forwarding of received packets in the downlink direction; (iv) which QoS to apply to received packets; (v) which bit rate to use for forwarding received packets; and (vi) whether to redirect received packets and, if so, to which address.

In one embodiment, a method is carried out by at least one of a policy enforcement function and a TDF in a telecommunication network. The method comprises a receiving procedure for receiving, from a policy decision function, an instruction. The instruction identifies at least one service instance of a service. In the instruction, the at least one service instance of the service is, or are, identified by the order according to which the at least one service instance of the service has been, have been, or may be started (ie, the service instance(s) of the service are identified by their starting order). The instruction also indicates at least one of: (i) a reporting rule, hereinafter referred to as "service instance level reporting rule", according to which the at least one of a policy enforcement function and a TDF should report, or should not report, information to the policy decision function after occurrence of an event relating to any one of the identified at least one service instance; and (ii) an enforcement rule, hereinafter referred to as "service instance level enforcement rule", that the at least one of a policy enforcement function and a TDF should enforce on a received packet relating to any one of the identified at least one service instance.

In one embodiment, the method carried out by the at least one of a policy enforcement function and a TDF further comprises a reporting procedure for reporting, after the occurrence of an event, information to the policy decision function by at least: (i) determining the service instance to which the event relates;

(ii) if a service instance level reporting rule exists for the service instance, applying that service instance level reporting rule; and, (iii) if a service instance level reporting rule does not exist for the service instance, applying a service level reporting rule existing for the service to which the event relates, or applying a default bearer reporting rule existing for the user terminal's connection to which the event relates.

In one embodiment, the method carried out by the at least one of a policy enforcement function and a TDF further comprises an enforcement procedure for enforcing rules on a received packet by at least: (i) determining the service instance to which the received packet relates; (ii) if a service instance level enforcement rule exists for the service instance, applying that service instance level enforcement rule; and, (iii) if a service instance enforcement rule does not exist for the service instance, applying a service level enforcement rule existing for the service to which the received packet relates, or applying a default bearer enforcement rule existing for the connection of the user terminal from which the received packet originates or to which the received packet is destined.

The invention also relates to network nodes, hosting functionalities implemented for example as programmed computers or sets of programmed computers.

In one embodiment, a network node hosts a policy decision function. The network node comprises: a providing unit configured for providing, to at least one of a policy enforcement function and a TDF, an instruction as described above, In one embodiment, a network node hosts at least one of a policy enforcement function and a TDF. The network node comprises: a receiving unit configured for receiving, from a policy decision function, an instruction as described above.

The invention also relates to computer program products and computer programs comprising computer-readable instructions configured, when executed on a network node or computer, to cause the network node or computer to carry out a method according to any one of the above-described embodiments, or to implement the functions of a network node according to any one of the above-described embodiments.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1A:
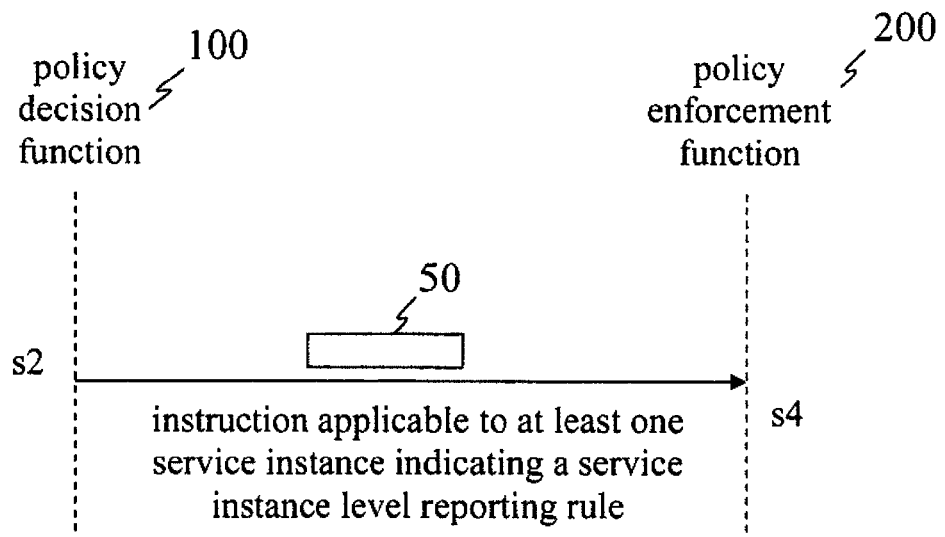
FIG. 1a is a message sequence chart schematically illustrating a providing procedure and a receiving procedure in the context of which a service instance level reporting rule is transmitted from a policy decision function to a policy enforcement function, in one embodiment of the invention.

FIG. 1a is a message sequence chart illustrating the exchange of messages between entities in a method according to one embodiment of the invention. The method illustrated in Fig. 1a involves a policy decision function 100 and a policy enforcement function 200.

In a providing procedure s2, policy decision function 100 provides an instruction 50 to policy enforcement function 200. instruction 50 is applicable to at least one service instance and indicates a service instance level reporting rule, In a receiving procedure s4, policy enforcement function 200 receives instruction 50.

After receiving instruction 50, policy enforcement function 200 performs reporting operations according to the received service instance level reporting rule. Namely, if, for example, a new service instance is activated to provide a service to a communication terminal (not illustrated on FIG. 1a), policy enforcement function 200 may apply the service instance level reporting rule depending on how many service instances of the service for the particular communication terminal have already been started. In particular, for example, if the service instance level reporting rule applies to the first to fifth service instances of a service, and if a fourth service instance is activated (and this is detected by policy enforcement function 200), policy enforcement function 200 performs reporting operations in accordance with the service instance level reporting rule applicable to this range of service instances. If, in accordance with the service instance level reporting rule, the event consisting in the activation of a service instance should be reported to policy decision function 100, policy enforcement function 200 does so. If, in contrast, the service instance level reporting rule provides that such an event should not be reported for the applicable range of service instances, policy enforcement function 200 abstains for reporting the occurrence of the event to policy decision function 100.

Although FIG. 1a schematically illustrates two entities, more entities may be involved. For example, policy enforcement function 200 may be implemented as a set of network nodes. There may also be user terminals, base stations, Node Bs, gateways, etc., which are not represented in FIG. 1a.

The instruction 50 transmitted from policy decision function 100 to policy enforcement function 200 may be in the form of a message or packet, i.e. a set of bits which can be transmitted over a communication network. Instruction 50 may also be transmitted through a series of packets or messages.

Figure 1B:
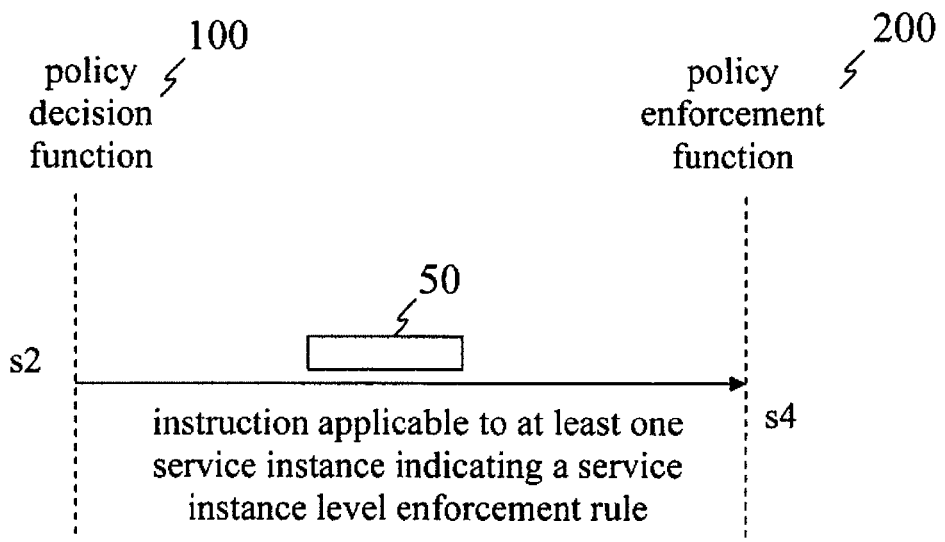
FIG. 1b is a message sequence chart schematically illustrating a providing procedure and a receiving procedure in the context of which a service instance level enforcement rule is transmitted from a policy decision function to a policy enforcement function, in one embodiment of the invention.

FIG. 1b is a message sequence chart illustrating a method in one embodiment of the invention, which differs from the method illustrated in FIG. 1a as follows. Instruction 50, which is applicable to at least one service instance, indicates a service instance level enforcement rule. Therefore, after instruction 50 comprising the service instance level enforcement rule is provided from policy decision function 100 to policy enforcement function 200, policy enforcement function 200 performs enforcement operations in accordance with (i.e., complying with) the service instance level enforcement rule. Namely, if a packet is received, and if policy enforcement function 200 determines that the packet relates to a service instance of a particular starting order, it applies the service instance level enforcement rule applicable to this range.

For example, if the service instance level enforcement rule provides that, for the first to the fifth service instances of a particular service, a given bandwidth is to be enforced on the received packets relating to these service instances, and if policy enforcement function 200 determines that a particular received packet relates to a service instance having a starting order of value "4" or "4th" (meaning that three other service instances have been started before that service instance), policy enforcement function 200 enforces the given bandwidth on the received packet accordingly.

This enables a PCC rule enforcement on a per service instance level basis taking into account the starting order of the service instances. This may be usable in cases wherein, e.g. according to policies determined by a telecom operator with respect to a user, and/or a particular service, a certain (limited) bandwidth is to be shared among the service instances relating to said user and/or said service (e.g. a certain aggregated limited bandwidth is to be shared by e.g. the first "n" instances of a service).

The detection of the service instance to which a received packet relates may involve deep packet inspection (DPI) carried out by policy enforcement function 200. DPI technology may be embedded in policy enforcement function 200. DPI technology supports packet inspection and service classification, whereby packets, such as for example Internet Protocol (IP) packets, are classified according to a configured tree of rules so that they are assigned to a particular service session, i.e. to a particular service instance. DPI technology may be also provided in a standalone network node, such as a node hosting the so-called TDF defined by reference [1], as an element of the PCC architecture. Packet inspection technology offers two types of analysis, namely shallow packet inspection and deep packet inspection (DPI). Shallow packet inspection extracts basic protocol information, such as IP addresses (source, destination) and other low-level connection states. This extracted information resides in the packet header itself and consequently reveals the principal communication intent. DPI, on the other hand, provides application awareness (i.e., service awareness) down to the service instance level. This is achieved by analysing the content in both the packet header and the payload over a series of packet transactions. There are several possible methods of analysis used to identify and classify applications and/or protocols that are grouped into signatures. One of these methods deals with heuristic signatures which are related to the behavioural analysis of user traffic.

Policy enforcement function 200 (and likewise, with reference to FIGS. 2a and 2b, TDF 300) may keep track of the respective starting orders of the existing service instances of a particular service provided to a particular user terminal (or a particular subscriber) by storing identification information for identifying each of the service instances in association with their current starting order.

Figure 2A:
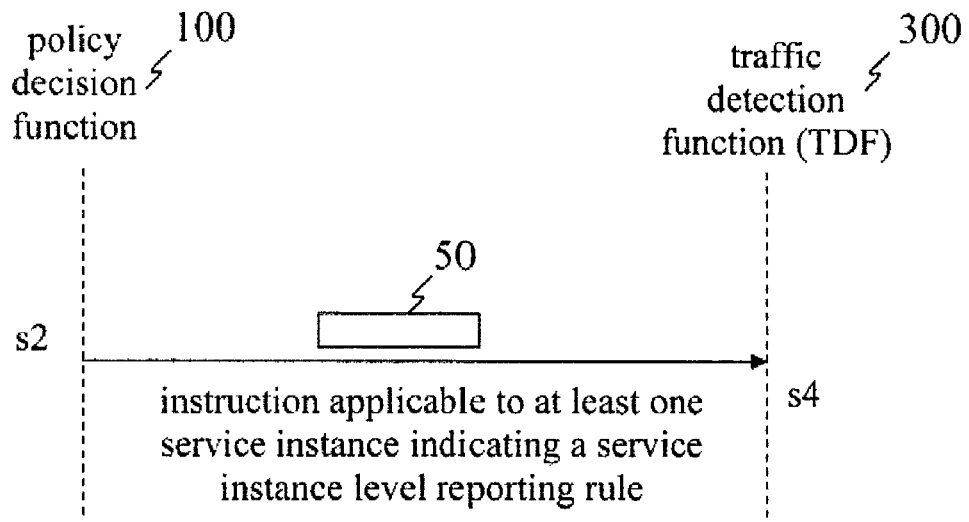
FIG. 2a is a message sequence chart schematically illustrating a providing procedure and a receiving procedure in the context of which a service instance level reporting rule is provided from a policy decision function to a TDF, in one embodiment of the invention.
Figure 2B:
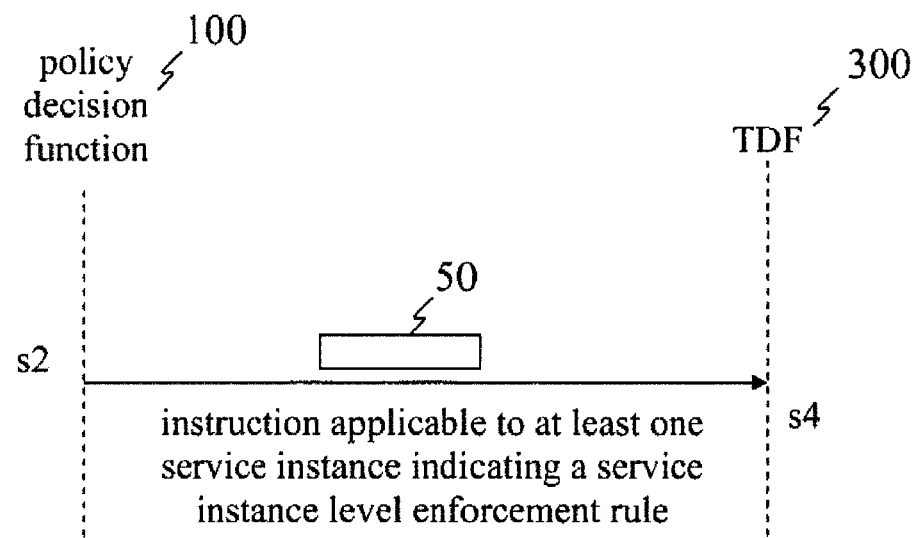
FIG. 2b is a message sequence chart schematically illustrating a providing procedure and a receiving procedure in the context of which a service instance level enforcement rule is provided from a policy decision function to a TDF, in one embodiment of the invention.

FIGS. 2a and 2b are flowcharts corresponding to respectively to FIGS. 1a and 1b except that, in FIGS. 2a and 2b, instruction 50 is provided to a TDF 300. The above-discussed considerations with reference to FIGS. 1a and 1b therefore apply mutatis mutandis to FIGS. 2a and 2b as well.

Although not illustrated on FIGS. 1a to 2b, policy decision function 100 may provide an instruction applicable to at least one service instance indicating both a service instance level reporting rule and a service instance level enforcement rule.

Further, in one embodiment, policy decision function 100 may provide, on the one hand, a first instruction 50 comprising one or more service instance level reporting rules to TDF 300, and policy decision function 100 may provide, on the other hand, a second instruction 50 to policy enforcement function 200, this second instruction 50 indicating one or more service instance level enforcement rules. These combinations, although not illustrated, constitute embodiments of the invention.

Figure 3:
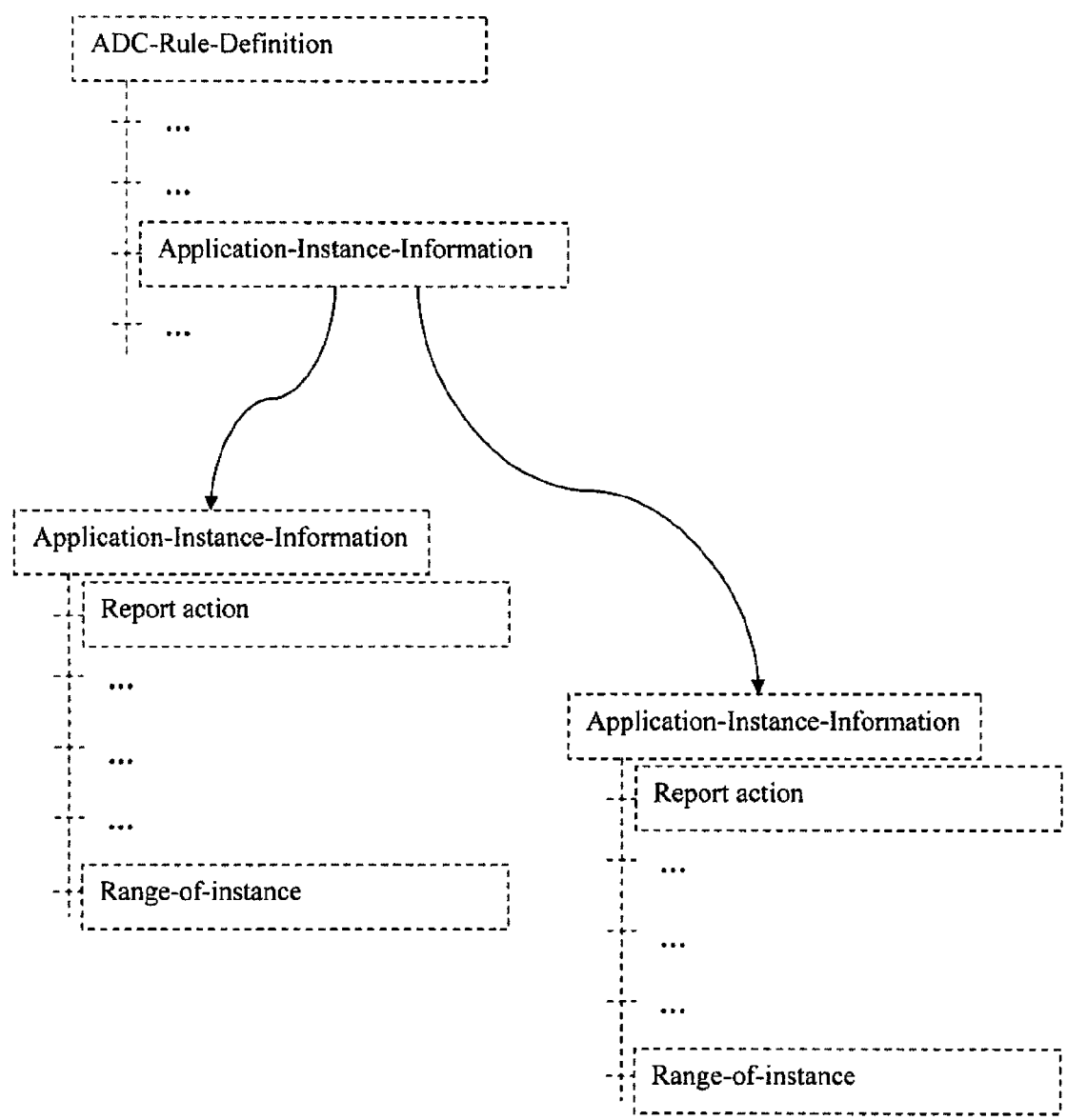
FIGS. 3 and 4 schematically illustrate exemplary logical structures of an instruction, in two embodiments of the invention.

FIG. 3 schematically illustrates the logical structure of an exemplary instruction 50 which may be sent from policy decision function 100 to policy enforcement function 200 or to TDF 300. At the service level, a so-called "ADC-Rule-Definition" attribute-value pair (AVP) defines a rule sent by policy decision function 100. Under that AVP, a number of lower-level AVPs may be provided at the service instance level.

This is illustrated by the so-called "Application-Instance-Information" AVP. Each of the "Application-Instance-Information" AVPs defines the rules applicable to a particular service instance or range of service instances. In particular, the "Application-Instance-Information" AVP may include a so-called "Report action" AVP indicating whether reporting is to be performed at the service instance level for a range of service instances identified by the so-called "Range-of-instance" AVP.

In such a manner, different ranges of service instances may be identified and corresponding report actions may be associated with each of these ranges.

Figure 4:
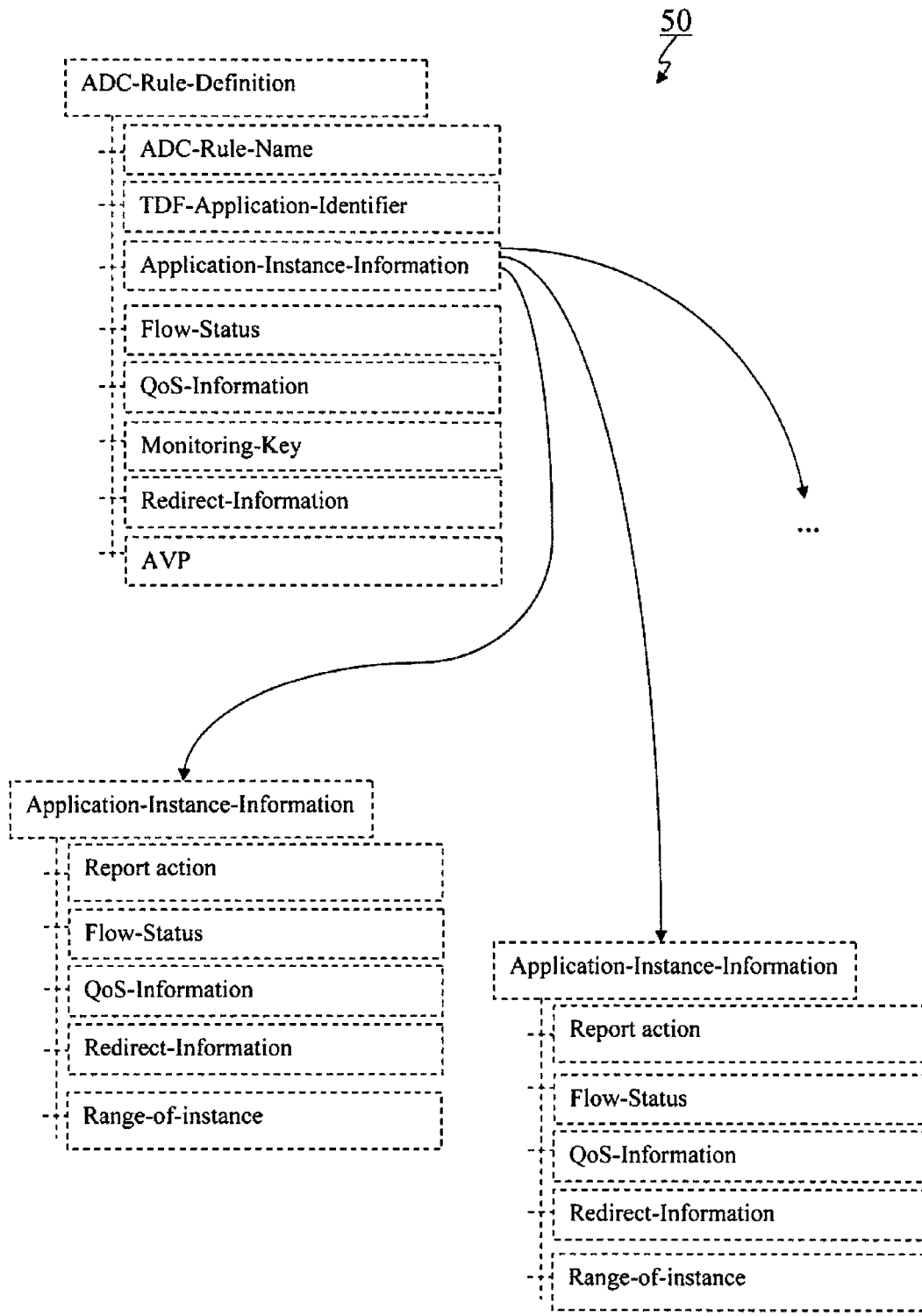

FIG. 4 schematically illustrates the logical structure of an exemplary instruction 50 in one embodiment of the invention. In particular, more exemplary AVPs are illustrated at the service level, i.e. under the "ADC-Rule-Definition" AVP, and at the service instance level, i.e. under the "Application-Instance-Information" AVP.

Background information about the purpose of an "ADC-Rule-Definition" AVP and an exemplary definition thereof may be found for example in reference [2], sub-clause 5.3.87 (entitled "ADC-Rule-Definition AVP"). Further information may be found:
(i) about the so-called "ADC-Rule-Name" AVP for example in reference [2], sub-clause 5.3.89 (entitled "ADC-Rule-Name AVP"),
(ii) about the so-called "TDF-Application-Identifier" AVP for example in reference [2], sub-clause 5.3.77 (entitled "TDF-Application-Identifier AVP");
(iii) about the so-called "Flow-Status" AVP for example in reference [2], sub-clause 4.6.2.2 (entitled "Gate function");
(iv) about the so-called "QoS-Information" AVP for example in reference [2], sub-clause 4.6.2.3 (entitled "Bandwidth limitation function");
(v) about the so-called "Monitoring-Key" AVP for example in reference [2], sub-clause 4.6.2.5 (entitled "Usage Monitoring Control"); and
(vi) about the so-called "Redirect-Information" AVP for example in reference [2], sub-clause 4.6.2.4 (entitled "Redirect function").

As shown on FIG. 4, "Flow-Status", "QoS-Information" and "Redirect-Information" AVPs are also provided at the service instance level (under the "Application-Instance-Information" AVP), to define a service instance level enforcement rule. The information about the "Flow-Status", "QoS-information" and "Redirect-Information" AVPs provided in reference [2] (as just mentioned above) may apply in the same manner at the service instance level.

The AVPs illustrated in FIG. 4 are only exemplary AVPs and other additional or different AVPs may be used for defining the reporting rule and the enforcement rules both at the service level and at the service instance level.

Figure 5A:
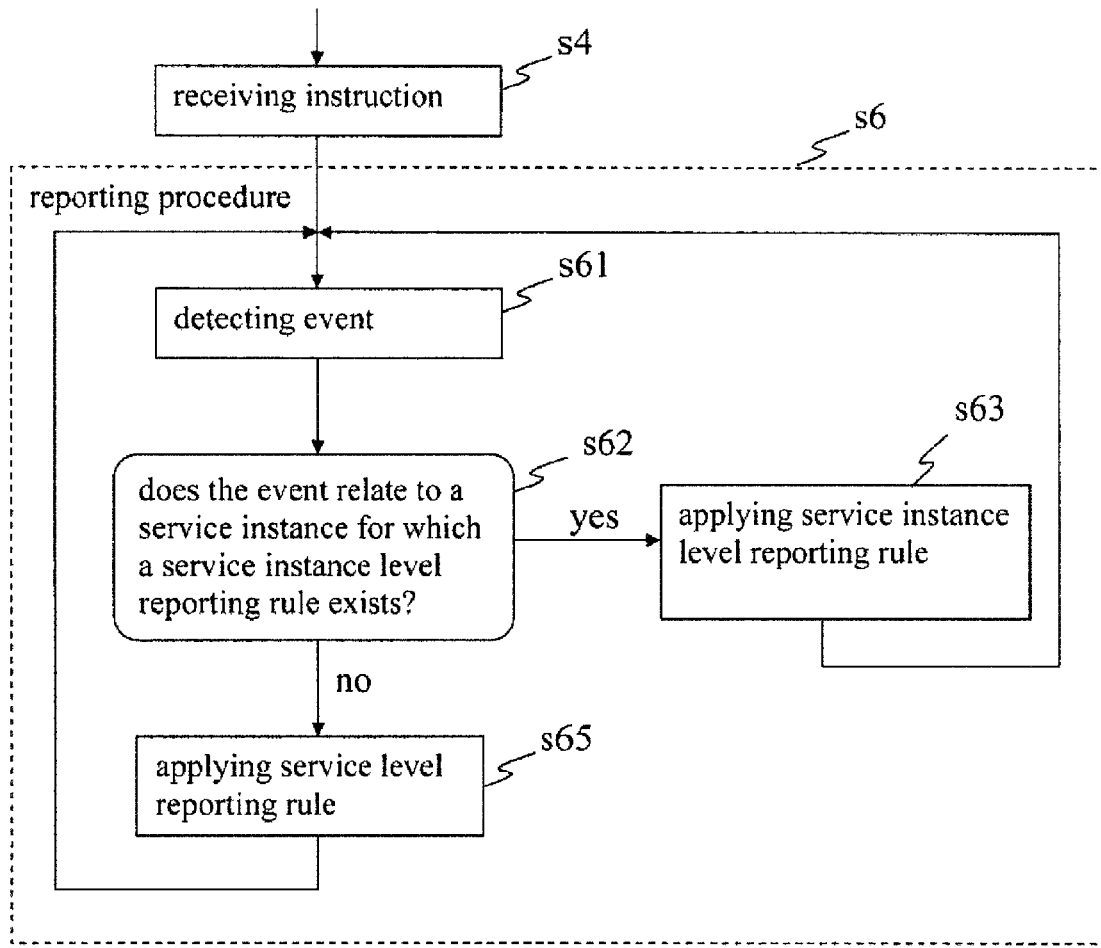
FIG. 5a is a flowchart schematically illustrating a receiving procedure and a reporting procedure, in one embodiment of the invention.

FIG. 5a is a flowchart of a method in one embodiment of the invention. The method may be carried out by a policy enforcement function (such as for example a PCEF) or by a TDF. After receiving, in step s4, an instruction from the policy decision function (such as for example a PCRF), the reporting procedure (step s6) is as follows. After detecting an event (step s61), the PCEF or TDF determines whether the event relates to a service instance for which a service instance level reporting rule exists (step s62). The determination is based on the order according to which the service instance has been started (i.e., based on the starting order of the service instance). If the event relates to a service instance for which a service instance level reporting rule exists ("yes" after step s62), the service instance level reporting rule is applied (step s63). If, on the contrary, the event relates to a service instance for which no service instance level reporting rule exists ("no" after step s62), a service level reporting rule is applied (step s65). This illustrates that, in this embodiment, the existence of a service instance level reporting rule prevails over the existence of a service level reporting rule.

Figure 5B:
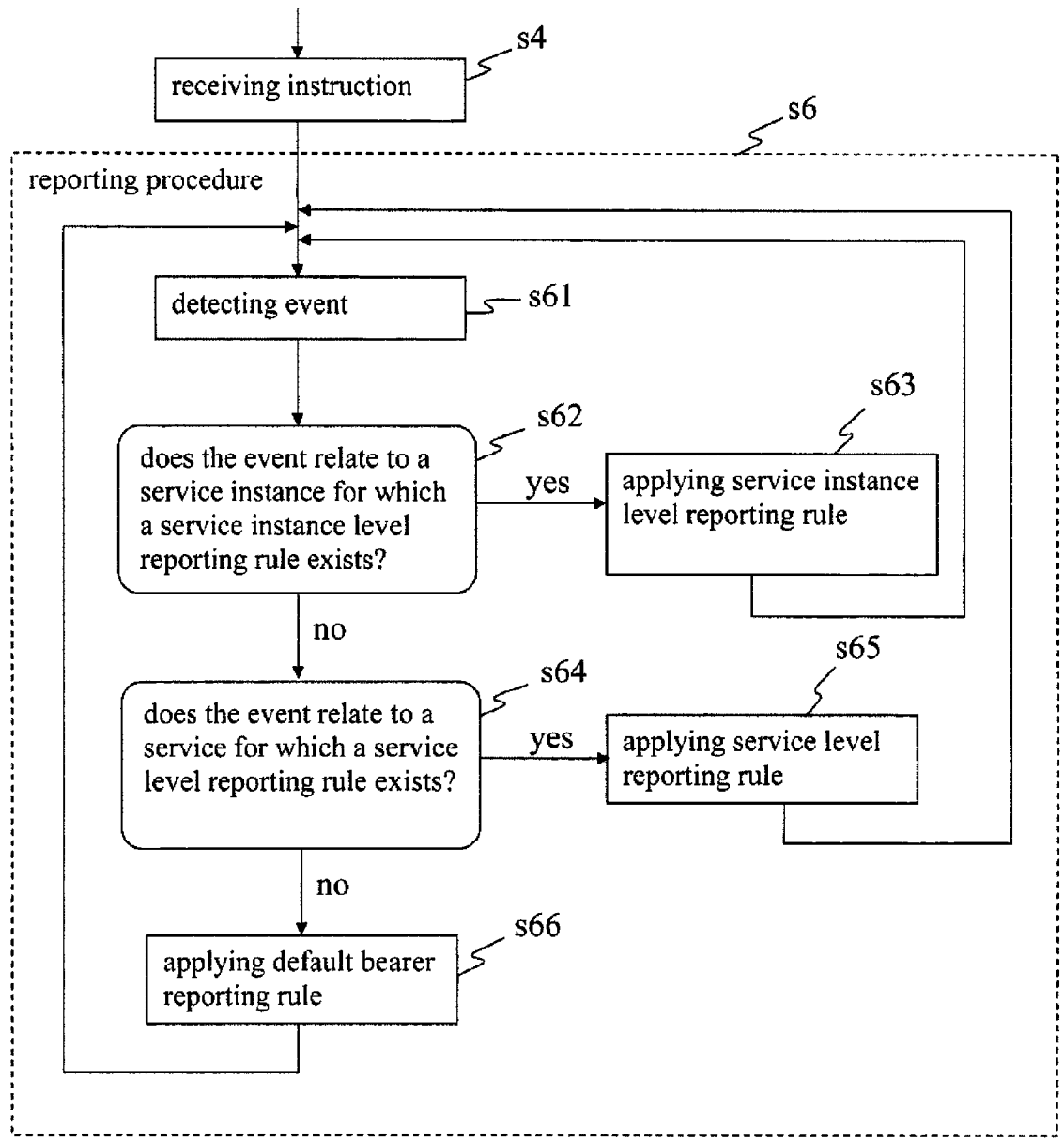
FIG. 5b is a flowchart schematically illustrating a receiving procedure and a reporting procedure in one embodiment of the invention, which differs from the embodiment of FIG. 5a in that it further comprises a step of applying a default bearer reporting rule.

FIG. 5b is a flowchart of an embodiment of the invention which differs from the embodiment illustrated by FIG. 5a as follows. In the embodiment illustrated by FIG. 5b, if the determination of step s62 is negative, i.e. if it is determined that the event relates to a service instance for which no service instance level reporting rule exists ("no" after s62), it is determined whether the event related to a service for which a service level reporting rule exists (step s64). If so ("yes" after step s64), the service level reporting rule is applied (step s65). On the contrary, if the event relates to a service for which no service level reporting rule exists ("no" after step s64), a default bearer reporting rule is applied (step s66).

The expression "default bearer reporting rule" refers to a reporting rule applicable (e.g., by default) to a connection set up for a user terminal. The default bearer reporting rule is applicable when no reporting rule exists at the service instance level and at the service level. A default bearer is generally the bearer set up for a terminal when the terminal attaches to the network. In other words, the default bearer reporting rule refers to the default values set out by the policy decision function (e.g., PCRF) for the data session (IP-CAN session/PDN connection) of the user terminal (which are generally defined according to the user profile of the user identified by the user terminal when it attaches to the telecommunication system).

Figure 5C:
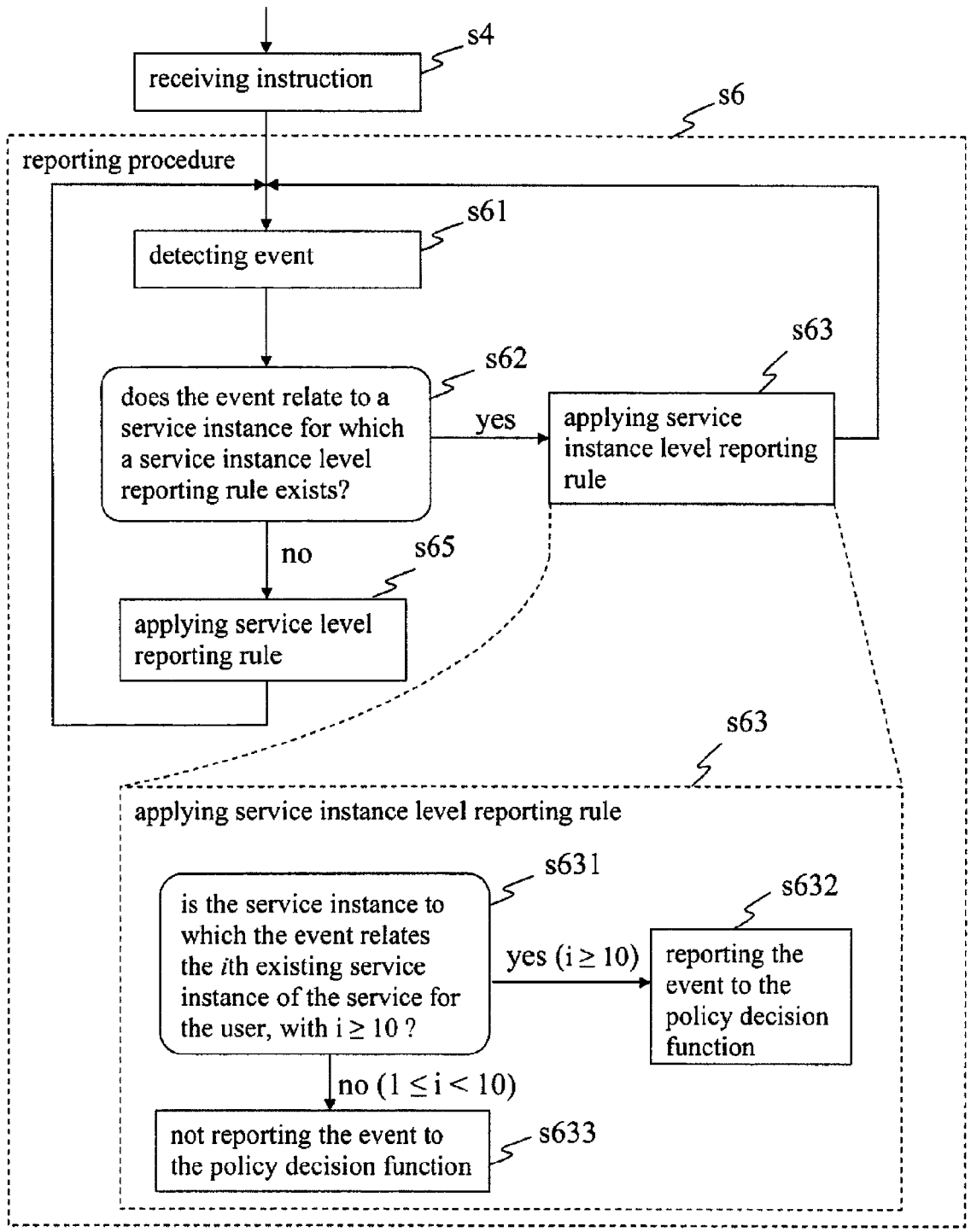
FIG. 5c is a flowchart schematically illustrating a receiving procedure and a reporting procedure in one embodiment of the invention, wherein an exemplary way of applying a service instance level reporting rule is further illustrated.

FIG. 5c differs from FIG. 5a in that an exemplary implementation of the step of applying a service instance level reporting rule (step s63) is shown. In particular, if the service instance to which the event relates is the ith existing service instance of the service of the user and if i is larger than or equal to 10 ("yes (i≥10)" after step s631), the occurrence of the event is reported (step s632) to the policy decision function. If, on the contrary, the service instance to which the event relates is the ith existing service instance of the service for the user with 1≤i<10 ("no (1≤i<10)" after step s631), the occurrence of the event is not reported (step s633). After the service instance level reporting rule has been applied by not reporting the event (step s633), the service level reporting rule is not applied (there is no arrow from step s63 to step s65). However, in another embodiment (not illustrated), both the service level reporting rule and the service level instance reporting rule may be applied if they are not conflicting.

FIG. 5c therefore illustrates an exemplary service instance level reporting rule requiring reporting of an event if the event relates to the tenth started service instance or more, If the event relates to a service instance started before the tenth service instance, the event is not reported, thus reducing the overall signaling towards the policy decision function.

Figure 6A:
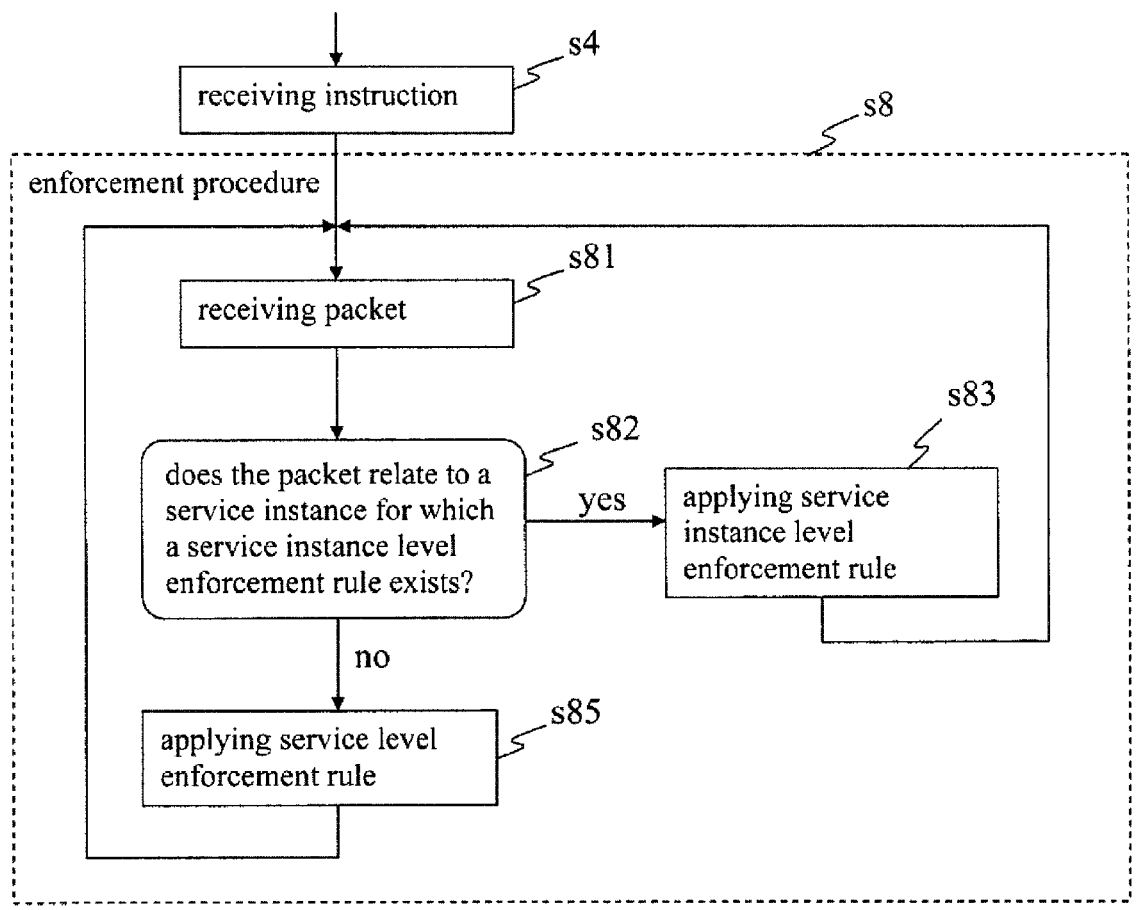
FIG. 6a is a flowchart schematically illustrating a receiving procedure and an enforcement procedure, in one embodiment of the invention.

FIG. 6a is a flowchart schematically illustrating a receiving procedure s4 and an enforcement procedure s8 in one embodiment of the invention. First, the policy enforcement function or TDF receives an instruction from the policy decision function (such as for example a PCRF) (step s4). Then, during the enforcement procedure (step s8), after receiving a packet (step s81), the policy enforcement function or TDF determines whether the received packet relates to a service instance for which a service instance level enforcement rule exists (step s82). If so ("yes" after step s82), the service instance level enforcement rule is applied (step s83). On the contrary, if the received packet relates to a service instance for which a service instance level enforcement rule does not exist (i.e., is not defined in the instruction for the starting order of the service instance at stake) ("no", after step s82), a service level enforcement rule is applied (step s85).

Figure 6B:
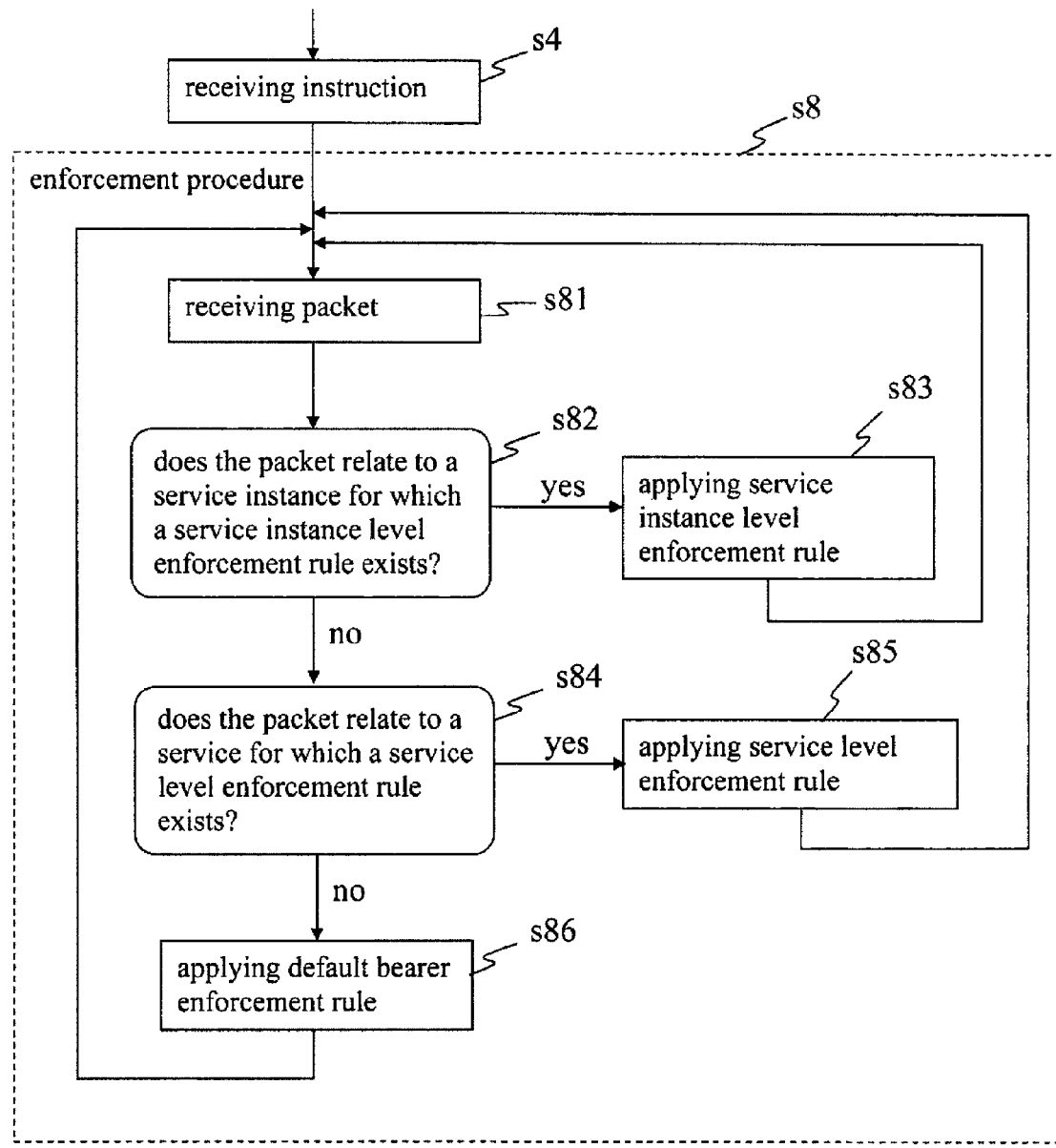
FIG. 6b is a flowchart schematically illustrating a receiving procedure and an enforcement procedure in one embodiment of the invention, which differs from the embodiment illustrated in FIG. 6a in that it further comprises a step of applying a default bearer enforcement rule.

FIG. 6b is a flowchart schematically illustrating a method in one embodiment of the invention, which differs from the method illustrated in FIG. 6a as follows. If it is determined that the received packet relates to a service instance for which no service instance level enforcement rule exists ("no" after step s82), it is determined whether the packet relates to a service for which a service level enforcement rule exists (step s84), If so ("yes" after step s84), the service level enforcement rule is applied (step s85). Otherwise ("no" after step s84), a default bearer enforcement rule is applied (step s86).

The expression "default bearer enforcement rule" refers to an enforcement rule applicable (e.g., by default) to a connection set up for a user terminal. The default bearer enforcement rule is applicable when no enforcement rule exists at the service instance level and at the service level. A default bearer is generally the bearer set up for a terminal when the terminal attaches to the network. The default bearer generally provides basis connectivity (in contrast to a so-called dedicated bearer). In other words, the default bearer enforcement rule refers to the default values set out by the policy decision function (e.g., PCRF) for the data session (IP-CAN session/PDN connection) of the user terminal (which are generally defined according to the user profile of the user identified by the user terminal when it attaches to the telecommunication system).

Figure 6C:
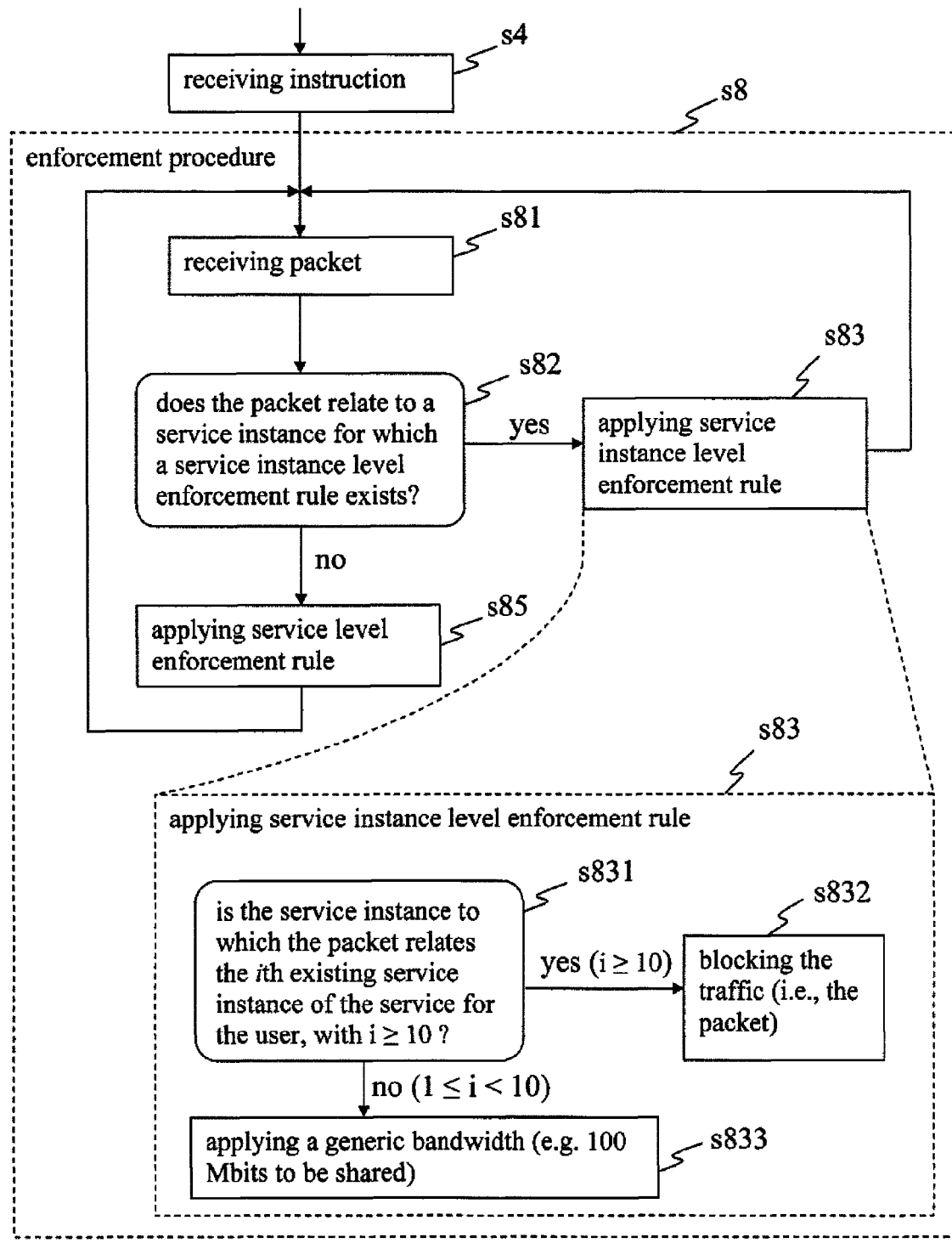
FIG. 6c is a flowchart schematically illustrating a receiving procedure and an enforcement procedure in one embodiment of the invention, wherein an exemplary way of applying a service instance level enforcement rule is further illustrated.

FIG. 6c differs from FIG. 6a in that an exemplary implementation of the step of applying a service instance level enforcement rule (step s83) is shown. In particular, according to the exemplary service instance level enforcement rule, if the service instance to which the received packet relates is the tenth service instance or more, ("yes (i≥10)" after step s831), the traffic is blocked (s832), whereas, if the service instance is one of the nine first service instances ("no (1≤i<10)" after step s831), the traffic is allowed and no gating is performed. Namely, a nominal bandwidth may be applied (step s833). After the service instance level enforcement rule has been applied (step s833), the service level enforcement rule is not applied (there is no arrow from step s83 to step s85). However, in another embodiment (not illustrated), both the service level enforcement rule and the service level instance enforcement rule may be applied if they are not conflicting. For example, there may be no conflict in case the service level enforcement rule defines a maximum QoS allowed for all concurrent service instances of the service whilst the service level instance enforcement rule defines the maximum QoS applicable to the service instance(s) to which the service level instance enforcement rule relates. Both rules can then apply simultaneously.

Now, to further understand the advantages of the invention, the context in which some embodiments of the invention have been developed and may be put into practice will be explained in more detail (notably with references to FIGS. 7 to 9), followed by the description of further embodiments of the invention.

Reference [1] discloses an exemplary PCC architecture involving a packet core network, which may include also legacy packet core networks (such as for example general packet radio service (GPRS) networks) as well various kinds of access networks (such as for example 3GPP access networks such as GERAN/UTRAN/E-UTRAN, and non-3GPP access networks such as fixed broadband, WLAN, etc.). In this context, "GERAN" stands for GSM EDGE Radio Access Network, "GSM" stands for Global System for Mobile Communications, "EDGE" stands for Enhanced Data rates for GSM Evolution, "UTRAN" stands for Universal Terrestrial Radio Access Network, "E-UTRAN" stands for evolved UMTS Terrestrial Radio Access Network, and "WLAN" stands for wireless local area network. The exemplary PCC architecture allows—among other things— determining and, subsequently enforcing policies for data flows relating to services involving a user terminal (UE) (i.e. services originated by the UE, or terminating in the UE) attached to said system and having a data session with said system (commonly known as "IP-CAN session"). In short, these policies define rules relating to charging and/or QoS aspects, as well as rules that permit detecting a service initiated or terminated by an UE, and/or that allow or block the access of the UE to said service.

In particular, reference [1] discloses an exemplary policy decision point (PDP, implemented by a PCRF) for making policy decisions with respect to services requested by the user of an UE, which are to be enforced by policy enforcing point(s) (PEP, implemented by a PCEF or by a TDF) that are commonly involved in routing signalling and/or media relating to said services, The PCRF behaves as a policy decision point (PDP), or policy server, which stores user policies and determines which ones are to be applied in each case. The nodes hosting the PCEF and/or TDF route data traffic flows to/from end users and behave as policy enforcing points (FE Ps) of said policies. The policy decisions made by a PCRF are transmitted, for example via the so-called "Gx" or "Sd" interfaces, to the policy enforcing point(s) (e.g. PCEF, TDF) that are involved in routing data flows conveying media and/or signalling of a service of an UE. In particular, policy decisions made by a PCRF are transmitted by means of FCC rules, and also by means of the so-called application detection and control (ADC) rules. Whilst PCC rules are transmitted only to a PCEF, ADC rules can be transmitted to both: a PCEF or a TDF. In particular, the ADC rules are transmitted to a TDF via the "Sd" interface, and to a PCEF via the "Gx" interface. The ADC rules provide the enforcing points (e.g. PCEF, TDF) with information to detect (and also to report to the PCRF) the usage by said UE of certain services, as well as with information for enforcing policies in respect to the corresponding data flows (e.g. blocking, allowing, managing bandwidth, redirecting, etc.).

Thus, a PCC architecture such as the one disclosed in reference [1] allows establishing policies with respect to data flow(s) relating to a service originated or terminated by an UE taking into account: the specific application service invoked or terminated by the UE (e.g. a IMS multimedia session, HTTP web browsing, etc.), and also the profile data corresponding to the subscriber identified by said UE when it attached to the telecommunications system, In this context, "IMS" stands for IP Multimedia Subsystem, "IP" stands for Internet Protocol, and "HTTP" stands for Hypertext Transfer Protocol.

Reference [1] discloses that this can be achieved by PCC rules, and/or by ADC rules including characteristics of the application server to which the UE connects for a service, which can be detected by the PCEF and/or TDF by inspecting packets on the packet data flow(s) originating or terminating in the UE. Examples of these characteristics comprise, generally, the destination and/or origination IP address and transport port of a data packet in the flow, or even data that have to be obtained by inspecting deeper the content of a received IP packet, such as: the protocol over the IP protocol of the packet (e.g. TCP or UDP), the kind of service (e.g. HTTP, SIP, FTP, etc.), or an identifier of the application service server (e.g. an URL associated to the server that receives or sends the IP packet). In this context, "TCP" stands for Transmission Control Protocol, "UDP" stands for User Datagram Protocol, "SIP" stands for Session Initiation Protocol, "FTP" stands for File Transfer Protocol, and "URL" stands for uniform resource locator.

Figure 7:
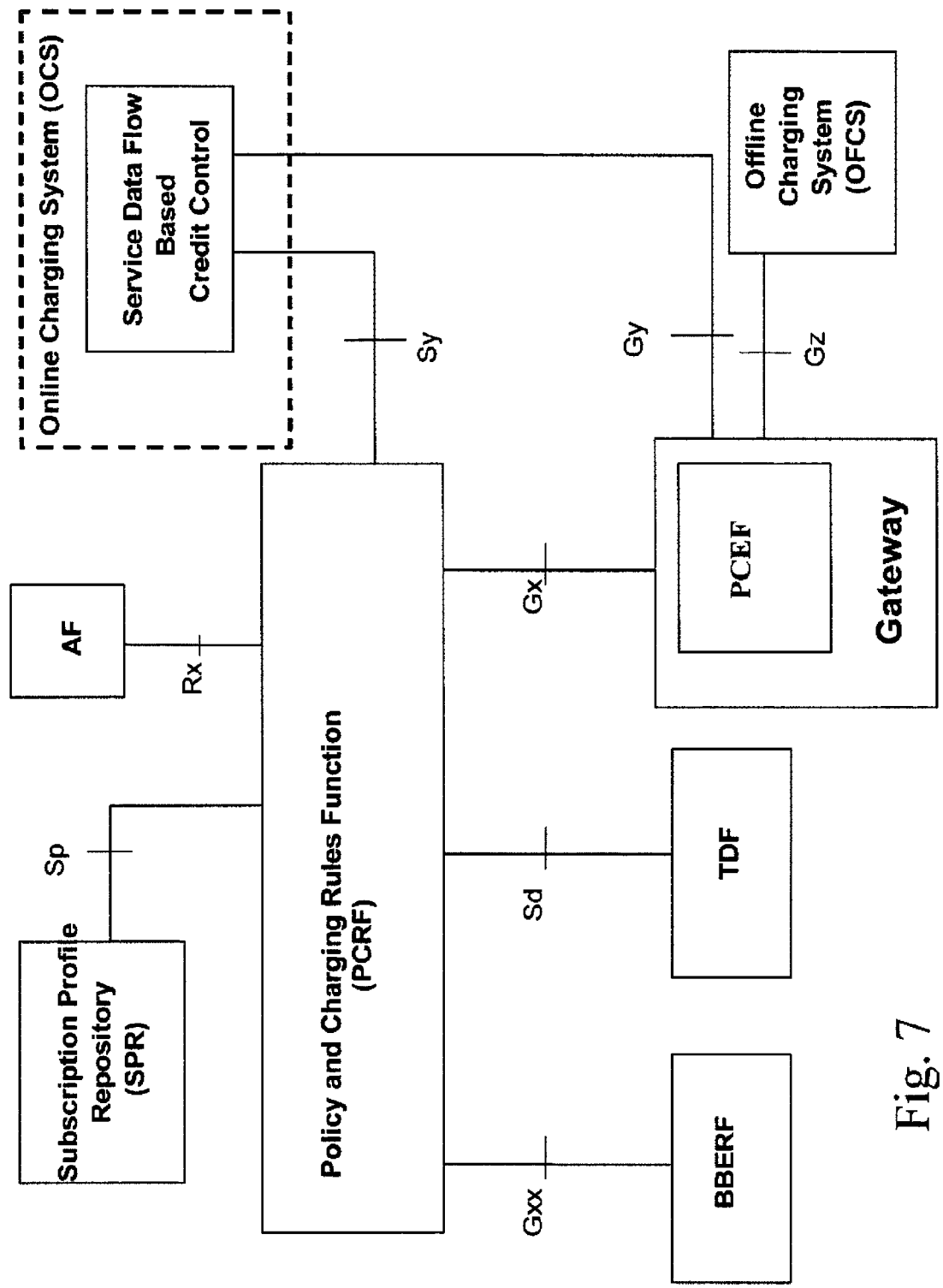
FIG. 7 schematically illustrates a PCC architecture in the context of which some embodiments of the invention may be implemented.

Thus, in this context, when a user terminal (often referred to as user equipment, UE) initiates a data session (such as for example an IP-CAN session) through the telecommunications system, the PCEF communicates it to the PCRF, which in turn downloads into the PCEF policy rules (PCC rules) to be applied to said data session, A PCC rule comprises a set of information enabling the detection of a data flow of a data session of a UE and providing parameters for policy control and/or charging control of a data flow of said data session. The TDF can perform deep packet inspection (DPI) for data flows belonging to said session, which comprises inspecting contents of IP-packets of these flows beyond the so-called IP-5 tuples (i.e. beyond, IP origination/destination addresses and ports, and used transport protocol) and, based on that, the TDF can report application service usage information to the PCRF for these data traffic flows, which in turn can download policy rules (ADC rules) to the TDF (as well as to the PCEF) to be enforced therein for these flows. FIG. 7.2-1 in reference [1] illustrates an exemplary IP-CAN session establishment, and the signalling interactions among nodes implementing the aforementioned functions, which allows an end user to establish one or more data traffic flows through the telecommunications system via one or more data bearers (referred therein as "IP-CAN bearers").

Whilst the PCRF is usually implemented within a stand-alone node, the PCEF is usually co-located within an access gateway, such as within a Gateway GPRS Support Node (GGSN), within a packet data network gateway (PDN-GW), or within any other network node routing data packets to/from a UE within the context of an IP-CAN session related to said UE. Since performing DPI on data packets of a plurality of data flows is a demanding task in terms of processing resources required in real-time, the TDF is often implemented as a stand-alone node. However, it is also envisaged that the TDF may be hosted on the same network node as the one hosting the PCEF. This option is mentioned in reference [1] (section 6.2.9, 4$^{th}$ paragraph).

As mentioned above, the TDF was introduced in recent 3GPP specifications (Release 11) in order to cope with what is referred hereafter as "service awareness" functionalities. In other words, the need for a TDF stems from the insight that the operator of a telecommunications network might be interested in having specific policies with regard to data traffic relating to certain services that can be initiated or terminated by UEs of its subscribers, so as for example to enforce specific charging and/or QoS policies in respect to data flows related to said services. The TDF is described for example in reference [1] (e.g. sections 4.5 and 6.2.9), and details of its communications with the policy decision function (PCRF) (i.e. via the so-called "Sd" interface) are disclosed for example in reference [2] (e.g. section 4.b).

A simplified, schematic view of an exemplary PCC architecture is shown on FIG. 7 (which is based on FIG. 5.1-1 of reference [1]). Amongst the entities schematically illustrated on FIG. 7, embodiments of the invention especially relate to, but are not limited to, improvements in the PCRF, TDF and PCEF.

A general description of some of the functional entities illustrated in FIG. 7 is provided below, based on section 6.2 of reference [1].

Namely, a PCRF is a functional entity encompassing policy control decision and flow based charging control functionalities. The PCRF provides, via its policy decisions, network control regarding the service data flow detection, gating (i.e. opening or closing the "gate" for allowing/disallowing data packets of certain data flows to go forward), QoS and flow based charging (except credit management) towards the PCEF. The PCRF receives session and media related information from an application function (AF) and informs the AF of traffic plane events. The PCRF is a policy decision point (PDP).

A PCRF provisions PCC rules to the PCEF for example via the Gx reference point and may provision QoS rules to the BBERF for example via the Gxx reference point (for deployments based on PMIP/DSMIP protocol in the core network).

The PCRF informs the PCEF through the use of PCC rules on the treatment of each service data flow that is under PCC control, in accordance with the PCRF policy decision(s).

A PCEF is a functional entity enforcing decisions. It encompasses service data flow detection (based on the filters definitions included in the PCC rules), as well as online and offline charging interactions and policy enforcement. Since the PCEF handles the bearers, it is in the PCEF that the QoS is being enforced for the bearer according to the QoS information coming from the PCRF. The PCEF may be located at the gateway (e.g. GGSN in the GPRS case). For the cases where there is PMIP or DSMIP in the core network, the bearer control is performed in the BBERF instead. The PCEF is a policy enforcing point (PEP).

An AF is a functional entity providing—or intervening in the provision of—a service to a UE. Since the data flows of an UE relating to a service (i.e., data flows originating and/or terminating in a UE as a result of a service invoked or terminated by the UE) can be subject to specific policies (e.g. policies relating to charging, and/or QoS, and or gating), the AF interacts with the PCRF (for example via the so-called "Rx" interface) so as to establish policy and/or charging control over the data bearers (IP-CAN bearers) conveying said data flows. One example of an AF is a Proxy-Call Session Control Function (P-CSCF) of an IP Multimedia Subsystem (IMS).

A TDF is a functional entity that performs application detection and reporting of detected application and its service data flow description to the PCRF. The TDF can act in solicited mode (upon request from the PCRF) or unsolicited mode (without any request from the PCRF). For deployments without a TDF, the PCEF may be enhanced with ADC functionality assuming the same functionality as the TDF for the solicited mode. As described for example in reference [1], section 6.2.9, a TDF may perform gating, redirection, and bandwidth limitation actions, wherein some of them may be driven by instructions received from the PCRF (e.g. via the so called "ADC rules"). Therefore, a TDF may also be considered as a policy enforcing point (PEP).

The TDF has been introduced essentially to provide service awareness. The TDF comprises—among other technical functionalities—deep packet inspection (DPI) functionalities that inspect and analyze the payload of data flows originated or terminated by the terminal of a user so as to detect e.g. when a service is initiated and/or terminated. As mentioned above, the TDF, may be hosted on a stand-alone network node, or may be hosted on a network node also hosting the PCEF (i.e., PCEF enhanced with ADC capabilities).

The information described hereinafter is based on reference [1] (which describes a PCC architecture in a telecommunications system), and on reference [2] (which describes details for communicating between a PCRF and a PCEF and/or a TDF, for example via the Gx and Sd interfaces), although the invention is not limited to implementations in this context.

The TDF can perform solicited and unsolicited application reporting towards the PCRF with respect to the services utilized by the terminal of a user. Therefore, service aware policy decisions may be taken by the PCRF, in respect of data flow(s) of a certain service, based on the solicited and/or unsolicited reporting received from any node implementing the TDF.

For the solicited case, the PCRF provides information to the TDF regarding which services to detect and report to the PCRF by activating the appropriate ADC rules.

The PCRF may instruct the TDF (or PCEF) what enforcement actions to apply for the detected application (i.e., service) traffic.

For the unsolicited case, the TDF is pre-configured regarding which applications to detect and report. The enforcement is performed in the PCEF.

For the solicited application reporting, the PCRF may instruct the PCEF to detect a service by providing the "ADC-Rule-Install" AVP including the "Application-Identifier" AVP (wherein "AVP" stands for attribute-value pair). If the PCRF requires to be reported about when the application start/stop is detected, it shall also subscribe to the APPLICATION_START and APPLICATION_STOP Event-Triggers.

When the start or stop of the service's traffic, identified by "TDF-Application -Identifier" AVP, is detected, if PCRF has previously subscribed to the APPLICATION_START/APPLICATION_STOP Event-Triggers, the PCEF reports the information regarding the detected service's traffic in the "Application-Detection -Information" AVP in the CCR command (wherein "CCR" stands for credit charging request).

For the same application (i.e. service), the user may initiate several instances. If the PCRF has subscribed to APPLICATION_START/APPLICATION_STOP Event-Triggers, each time a new service instance is detected, and if the related flow information is deducible, the PCEF reports the information regarding the detected service instance. Within the information reported, a service instance identifier is included to allow correlation between start and stop events.

The PCRF may make the policy decision based on the information received for the applications (i.e. services) and applications instances (i.e. service instances) detected and send the updated PCC and ADC rules to the PCEF, and updated QoS rules to the BBERF, if applicable.

Figure 8:
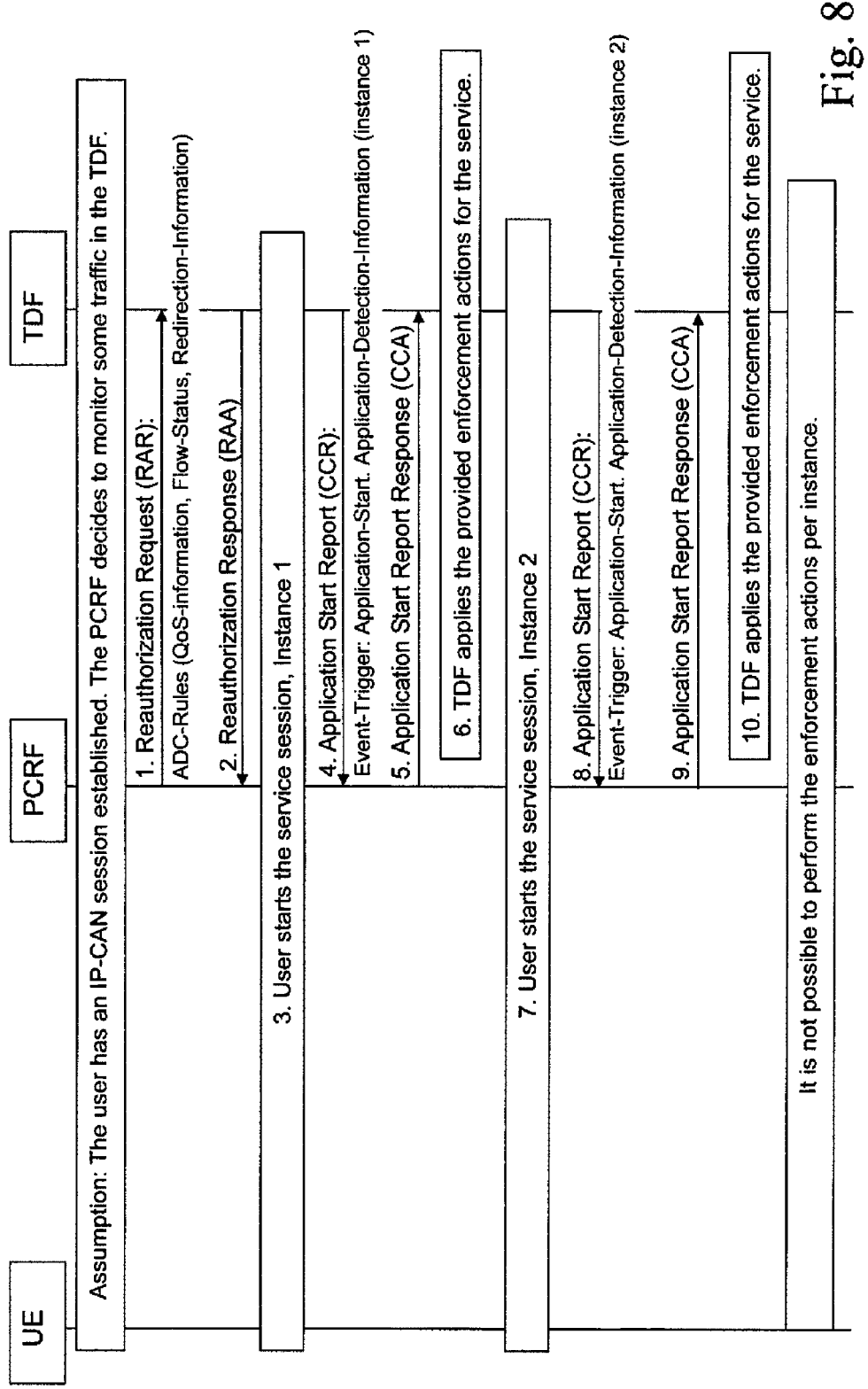
FIG. 8 is a message sequence chart showing how subscription and reporting may possibly be applied in a prior art solution, in order to illustrate problems that some of the embodiments of the invention address.
Figure 9:
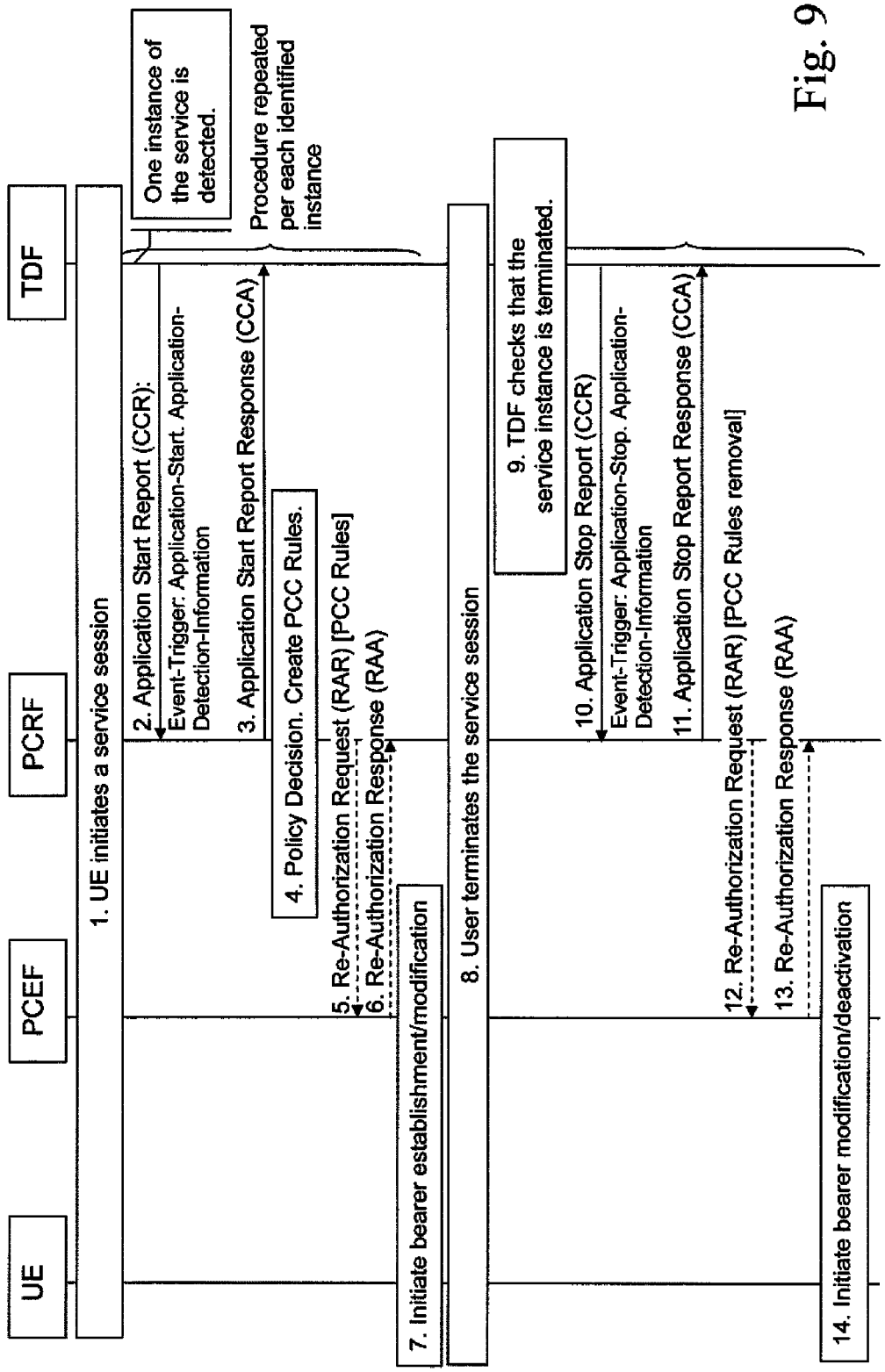
FIG. 9 is a message sequence chart illustrating a possible prior art scenario involving a PCEF, in order to illustrate problems that some embodiments of the invention address.

Now that the context in which some embodiments of the invention have been developed and may be put into practice has been explained, two message sequence charts are provided in FIGS. 8 and 9 to highlight exemplary interactions between the above-mentioned entities in a FCC architecture. This will further enable to understand some of the problems addressed by embodiments of the invention.

FIG. 8 is a message sequence chart showing how the subscription and reporting may possibly occur in a prior art system in accordance with references [1] and [2].

It is assumed that the user has a PDN connection established and thus an IP-CAN session is already established with the PCRF. Based on internal policies, the PCRF decides to monitor some traffic in the TDF. This is illustrated on FIG. 8 by the box labelled "Assumption: The user has an IP-CAN session established. The PCRF decides to monitor some traffic in the TDF."

(step 1) The PCRF provides the TDF with the ADC rules that require monitoring in the TDF (ADC-Rule-Install AVP), The PCRF may also indicate if specific enforcement actions are required upon detection of the service: bandwidth limitation (QoS-Information AVP), gating (Flow-Status AVP) and/or redirection (Redirection-Information AVP). This is illustrated on FIG. 8 by the arrow labelled "1. Reauthorization Request (RAR): ADC-Rules (QoS-information, Flow-Status, Redirection-Information)". The PCRF may also indicate if the service has to be reported (Event-Trigger AVP set to Application_Start/Application_Stop with no Mute_Notification AVP included).

(step 2) The TDF installs the ADC rules provided by the PCRF. This step may occur also as part of the IP-CAN session establishment procedure. In that case, the ADC rules are provided as part of a CCA command (wherein "CCA" stands for credit-control answer). A response is then sent back to the PCRF, as illustrated by the arrow labelled "2. Reauthorization Response (RAA)".

(step 3) The user starts using a service for the first time. This is illustrated by the box labelled "3. User starts the service session, Instance 1".

(step 4) The TDF detects the traffic related to that service (i.e. there is an active ADC rule for that service). The TDF informs the PCRF by including the related event (Event-Trigger AVP) and the TDF-Application-Information AVP that indicates the service (TDF-Application-Identifier AVP), the instance (PDF-Application-Instance-Identifier AVP) and the identified flow data (Flow-Information AVP). This is illustrated by the arrow labelled "4. Application Start Report (CCR): Event-Trigger: Application-Start. Application-Detection-Information (instance 1)".

(step 5) The PCRF responds back, as illustrated by the arrow labelled "5. Application Start Report Response (CCA)".

(step 6) The TDF applies the enforcement actions indicated by those ADC rules. This step may occur in parallel with step 5. This is illustrated by the box labelled "6. TDF applies the provided enforcement actions for the service."

(steps 7-10) The same procedure (steps 3-6) is repeated whenever a new service instance is identified (as illustrated successively by the box labelled "7. User starts the service session, Instance 2", by the arrows labelled "8. Application Start Report (CCR): Event-Trigger: Application-Start. Application-Detection-Information (instance 2)" and "9. Application Start Report Response (CCA)", and by the box labelled "10. TDF applies the provided enforcement actions for the service.").

In that context, it is therefore not possible to enforce rules on a per service instance basis.

The enforcement actions may also be performed in the PCEF, when the flow data related to the service are known and the PCRF can create the PCC rules related to the monitored ADC rules. FIG. 9 is a message sequence chart illustrating this case, including both the detection of the service start and stop, in a prior art system.

It is assumed that the user has an IP-CAN session established and ADC rules are already installed in the TDF.

(step 1) The UE initiates a service session (or a service instance for a service session already established), as illustrated on FIG. 9 by the box labelled "1. UE initiates a service session".

Then, for each service instance initiated, steps 2 to 7 are performed:

(step 2) The TDF detects a service instance for a service for which an ADC rule exists (as illustrated by the box labelled "One instance of the service is detected" at the right-hand side of FIG. 9). The TDF informs the PCRF by sending a CCR command (similarly to step 4 on FIG. 8). This is illustrated on FIG. 9 by the arrow labelled "2. Application Start Report (CCR): Event-Trigger: Application-Start. Application-Detection-Information".

(step 3) The PCRF responds back, as illustrated by the arrow labelled "3. Application Start Report Response (CCA)".

(step 4) The PCRF creates the PCC rules based on the flow information provided by the TDF. This is illustrated by the box labelled "4. Policy Decision. Create PCC Rules.

(step 5) The PCRF provides the PCC rules to the PCEF. As part of these PCC rules, there may be enforcement actions, such as: bandwidth-limitation (QoS-Information AVP), gating (Flow-Information AVP), etc. This is illustrated by the arrow labelled "5. Re-Authorization Request (RAR) [PCC Rules]".

(step 6) The PCEF responds back, as illustrated by the arrow labelled "6. Re-Authorization Response (RAA)".

(step 7) The PCEF initiates the bearer establishment/modification procedure based on the PCC rule information, as illustrated on FIG. 9 by the box labelled "7. Initiate bearer establishment/modification".

Then, for each service instance which is terminated, steps 8 to 14 are performed:

(step 8) The UE terminates one of the instances related to the service session. This is illustrated by the box labelled "8. User terminates the service session".

(step 9) The TDF detects the termination of the service instance, as illustrated by the box labelled "9. TDF checks that the service instance is terminated."

(step 10) The TDF informs the PCRF that the service instance is terminated: The

Event-Trigger AVP is included set to Application-Stop. The TDF-Application-Information AVP that indicates the service (TDF-Application-Identifier AVP) and the detected instance (TDF-Application-Instance-Identifier AVP) is provided. This is illustrated by the arrow labelled "10. Application Stop Report (CCR) Event-Trigger: Application-Stop. Application-Detection-Information".

(step 11) The PORE then responds back as illustrated by the arrow labelled "11. Application Stop Report Response (CCA)".

(step 12) The PCRF removes the PCC rule(s) related to that instance by sending a RAR command to the PCEF, as illustrated by the arrow labelled "12. Re-Authorization Request (RAR) [PCC Rules removal]", (step 13) The PCEF responds back, as illustrated by the arrow labelled "13. Re-Authorization Response (RAA)".

(step 14) The PCEF initiates the related bearer procedure (i.e. it either terminates or modifies the affected bearer), as illustrated by the box labelled "14. Initiate bearer modification/deactivation".

As shown on FIGS. 8 and 9, the PORE may change the enforcement actions related to a service based on the instance detection reporting. That is, the bandwidth may be limited when the number of instances surpasses some figure, or the traffic related to that service can be blocked if there are multiple instances of the same service running in parallel. These actions are always performed at service level however, That is, the PCRF can modify the bandwidth of the service, but, in the prior art, it cannot control the bandwidth of a service instance or group of service instances.

Let us now further discuss some of the problems addressed by embodiments of the invention, for further understanding the context in which some embodiments of the invention have been developed.

In the prior art procedures, each time an application (i.e., a service) is initiated, if the PCRF has previously subscribed to application start/stop events, the PCEF/TDF reports the information about the detected application. Besides, if several instances for the same application are initiated, the PCEF/TDF reports for each of the instances.

Considering as an example a P2P application, the PCRF may install an ADC rule on the PCEF for this application (i.e., service). If a user initiates this service to download several videos in parallel, the PCEF/TDF will inform the PCRF for each of the videos downloaded.

It may be that the PCRF is not interested in being informed about the particular service instances in the case that the policy decision does not depend on the service instance information or number of service instances.

On the other hand, depending on the application type (i.e., service type), the number of service instances initiated can be huge, thus leading to an unnecessary avalanche of notifications towards the PCRF that may overload the PCRF. For example, in the case of HTTP browsing application, each URL accessed may be considered as a service instance.

Moreover, it has been recognized by the inventors that an operator may be interested in controlling the number of service instances being handled in parallel, in order not to allow the user to e.g. download more than three videos at the same time (resource control). In that case, the rest of service instances related to that application (i.e., service) may be gated. It is also for example possible that, instead of gating, the operator decides to reduce that bandwidth progressively (e.g. bandwidth x (service instances 1-3), bandwidth x-n (service instances 4-6), bandwidth x-n-m (service instances 7-10)). It is also possible that the operator decides to redirect the traffic once a number of service instances is reached.

With the prior art procedures, these scenarios cannot be handled since the actions can only be performed at service level and not at service instance level, Therefore, to summarize what has been explained above regarding the context in which some embodiments of the invention have been developed, reference [1] discloses a PCC architecture comprising, among other: a PCRF (making policy decisions), a PCEF (enforcing policy decisions) and a TDF (detecting application traffic and also enforcing policy decisions). Reference [2] provides protocol details of the interfaces linking these entities.

In particular, the "Sd" interface (PCRF-TDF) of the PCC architecture allows, among other, the PCRF to "subscribe" to events related to the initiation and termination of a service detected by the TDF with respect to a user data session (e.g. a HTTP data browsing, a P2P communication, a VoIP communication, etc.). Accordingly, the TDF will notify these events to the PCRF that has subscribed to them. This allows the PCRF to subsequently decide—based on the reported event(s) from the TDF—further policies (e.g. QoS and/or charging policies for a detected initiated service, and/or for any other data flows of said user, and/or for any subsequent service initiated by the user, etc.). These policies are then transmitted in the form of PCC rules and/or ADC rules to the PCEF and/or to the corresponding TDF for enforcement. In other words, the "subscription"/"notification" features allow the PCRF to decide policies in respect to data flows on a per user and service basis. However, this advantage is achieved to the cost of a high signalling rate, since, for a single user data session, every detected event related to the initiation/termination of a service instance implies a message sent to the PCRF (e.g. every time a user sends a HTTP message requesting a URL).

Further, if the PCRF decides to block a service (i.e. the service is "gated" so that data packets of its related data flow(s) are not forwarded), the prior art solution causes a situation wherein all the ongoing instances of said service are blocked also, since the rules decided by the PCRF that are further transmitted to the enforcing points (e.g. PCEF/TDF) are on a per service (and user) basis. This can be advantageous in certain circumstances but may be undesirable in others.

Therefore, it is desirable to provide a PCC architecture with a flexible control of policies on a per user and service basis, in a flexible and precise manner, but without implying more signalling between entities.

In view of these problems, some embodiments of the invention encompass a solution wherein at least part of the policy decision logic with respect to services that can be originated or terminated by a user is transmitted from the PCRF to the TDF. The solution allows a faster enforcement of the corresponding ADC rules within the TDF in a flexible and precise manner, which does not require notifying by the TDF to the PCRF on a per service instance basis for all service instances, and which thus does not increase the signalling between these two entities.

This is achieved in some embodiments of the invention by adding new information from the PCRF to the TDF when sending rules (e.g. ADC rules) in respect to a type of service that is to be detected by the TDF. The newly added information establishes rules for a service, but on a per service instance basis. This allows, for example, to define: a first set of values for "Flow-Status" (i.e. "gating") and/or "QoS-Information", and/or "redirecting information", for the three first instances of a certain service, and a second set of any of these values ("gating", QoS-Information" or "redirecting information") for the fourth and subsequent instances of the service.

Among other, this allows, for example, to limit the maximum concurrent instances of a certain service for a user, and/or limit the maximum number of service invocations of the service within a data session, and/or modify the QoS and/or charging parameters that apply for certain or all of the data flows of the UE of said user depending on the usage of a certain service by said UE.

Some embodiments of the invention therefore introduce a new mechanism that allows optimizing the notifications from the PCEF/TDF to the PCRF for service detection and that allow more granularity in the control of the allowed service instances.

During the establishment of the IP-CAN session or at IP-CAN session modification based on internal policies, the PCRF may provide an instruction the TDF/PCEF regarding which applications to detect and report to the PCRF by activating the appropriate ADC rules and the enforcement actions to apply for the detected application traffic.

As part of the ADC rule information, some embodiments of the invention propose to add new information to specify how the PCEF/TDF should manage the service instances. The information in the ADC rule may indicate if the PCRF is interested or not in being informed about the particular service instances or only at service level (i.e. when the first and the last instance of the service is detected). Besides, the ADC rule information may indicate, i.e. specify, actions to be enforced for a range of instances. For example, this enables to:

Deny multiple concurrent service instances (e.g. of the same service).

Assign certain bandwidth for the first concurrent "n" instances of a service and other level of bandwidth for the subsequent service instances. For example, to make throttling of the rest of the service instances and prioritize the first "n" service instances.

Allocate a "dedicated bearer" (i.e. an additional bearer to the "default bearer" within the same PDN connection with specific QoS and charging demands) for the first service instance and use the "default bearer" (i.e. the bearer that is established when the PDN connection is established with generic QoS demands and that will last the duration of the PDN connection) for the rest of concurrent service instances (feasible when service instances definition, IP tuples, are known and distinct).

Allow "n" concurrent application service instances and redirect subsequent service instances.

Allow "n" concurrent service instances and gate subsequent service instances.

In one embodiment, the method is as follows. The following AVP is defined for application detection (i.e., for service detection):

ADC-Rule-Definition: =

⟨AVP Header: 1094⟩{ADC-Rule-Name}[TDF-Application-Identifier]

*[Application-Instance-Information][Flow-Status][QoS-

Information][Monitoring-Key][Redirect-Information]*[AVP]

This AVP is included within the "ADC-Rule-Install" AVP and is used to provide the PCEF/TDF with the information related to an ADC rule, i.e. the service to be monitored (TDF-Application-Identifier AVP), and the enforcement actions that apply to that service: gating (Flow-Status AVP), bandwidth limitation (QoS-Information AVP) and redirection (Redirection-Information AVP).

The method according to one embodiment of the invention extends the ADC rule definition to define the application instance treatment (i.e., service instance treatment), by adding one or multiple instances (shown with the "*" in the "ADC-Rul-Definition" AVP definition above) of a new AVP: "Application-Instance-Information".

Application-Instance-Information: =

⟨AVP Header: xxxx⟩[Report-Action][Flow-Status][QoS-

Information][Redirect-Information][Range-of-Instances]

The "Report-Action" AVP is a new AVP that indicates if the PCEF/TDF should report or not the initiation/termination of the service instance(s). It can be an enumerated AVP containing the following values, for example:

No report (0)
Report individually (1)
Report only the last instance (2)

The "Range-of-Instances" AVP is a new AVP that indicates that the conditions under "Application-Instance-Information" AVP apply only to that range. For example, if its value is "1-5", for the first five concurrent detected service instances, the bandwidth (included within the QoS-Information AVP), gating (included within the Flow-Status AVP) and redirection (included within the Redirection-Information AVP) under "Application-Instance-information" AVP will apply. If there is another "Application-Instance-Information" AVP that contains "Range-of-Instances" AVP set to "6-10", the next concurrent five service instances (i.e. from service instance 6 to service instance 10) will have the conditions included in that AVP. The value may indicate that from service instance N onwards the specified conditions apply.

The "Flow-Status", "QoS-information" and "Redirect-Information" AVPs are existing AVPs that are now also defined within the "Application-Instance-Information" AVP in order to specify the treatment in terms of gating, QoS and redirection for the service instances identified with "Range-of-Instances" AVP. If these AVPs are not specified in the "Application-Instance-Information", then for all the service instances, the conditions defined in the "Flow-Status", "QoS-Information" and "Redirect-Information" AVPs defined in the "ADC-Rule-Definition" AVP apply. If "Flow-Status" and "Redirect-Information" AVPs are specified at both "Application-Instance-Information" and "ADC-Rule-Definition" AVP, the information at "Application-Instance-Information" AVP prevails.

With regards to "QoS-Information" AVP, the value provided at "ADC-Rule -Definition" level refers to the maximum QoS allowed for all concurrent service instances of the detected application. The value provided within "Application-Instance -Information" refers to the maximum QoS applicable to the referred service instances. Both AVPs can then apply simultaneously.

Further embodiments of the invention will now be described with reference to FIGS. 10 and 11.

Figure 10:
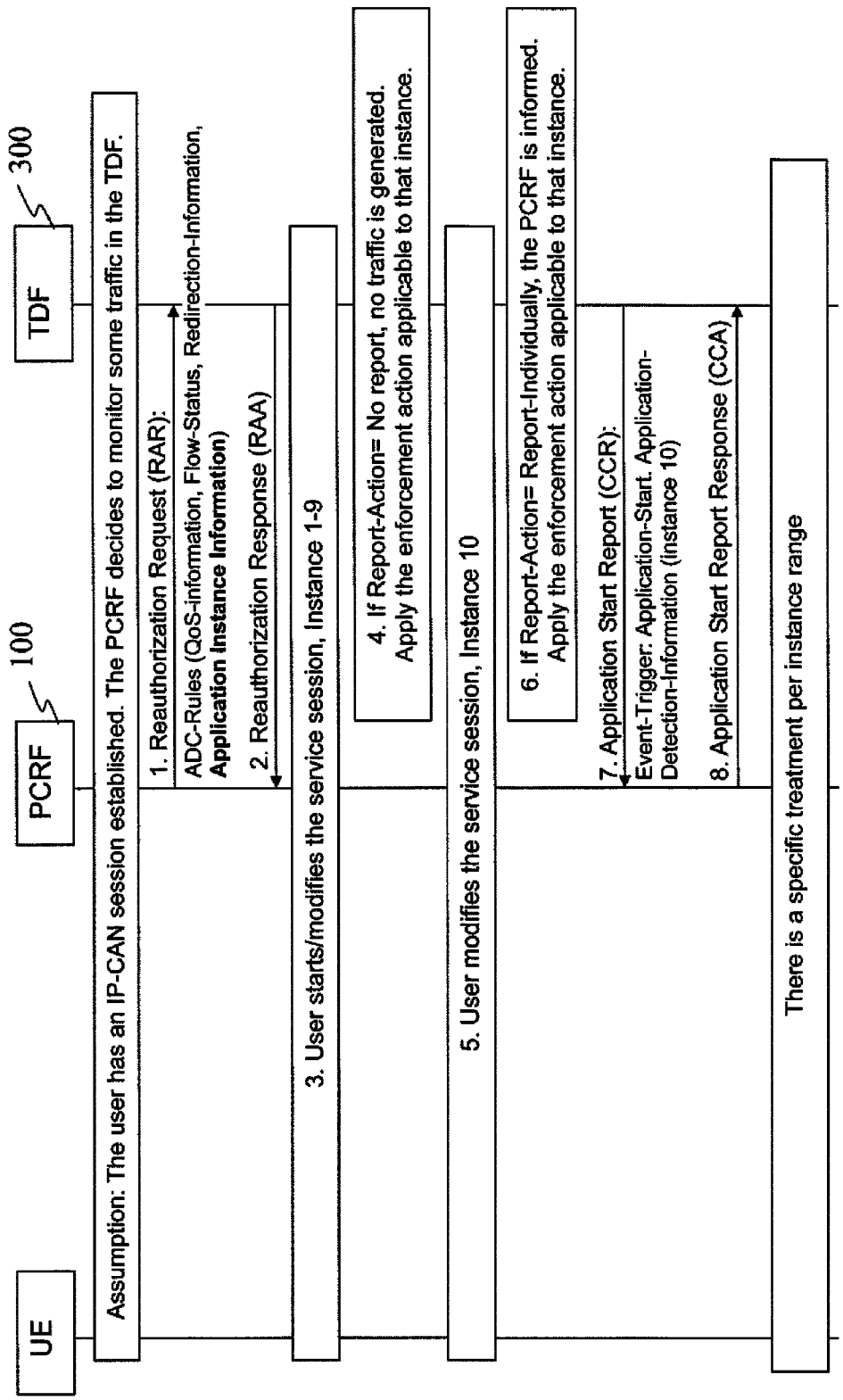
FIG. 10 is a message sequence chart schematically illustrating a method in one embodiment of the invention.

FIG. 10 is a flowchart of a method in one embodiment of the invention, involving, both, service detection and enforcement performed in a TDF 300.

In this embodiment, the operator may want, for example:
To be informed only when ten service instances are running in parallel for that service.
For the first nine service instances, a generic bandwidth (e.g. 100 Mbits to be shared) is to be applied.
For the tenth service instance onwards, the traffic should be blocked.

It is assumed that the user has a PDN connection established and thus an IP-CAN session is already established with PCRF 100. Based on internal policies, PCRF 100 decides to monitor some traffic in TDF 300. This is illustrated on FIG. 10 by the box labelled "Assumption: The user has an IP-CAN session established. The PCRF decides to monitor some traffic in the TDF."

(step 1) PCRF 100 provides TDF 300 with the ADC rules that require monitoring in TDF 300 (ADC-Rule-Install AVP). As part of this embodiment, PCRF 100 provides the Application-Instance-Information AVP within the ADC-Rule-Install AVP. This is illustrated by the arrow labelled "1. Reauthorization Request (RAR): ADC-Rules (QoS-information, Flow-Status, Redirection-Information, Application Instance Information)".

To do so, PCRF 100 provides, in the instruction, two instances of Application-Instance-Information AVP. They may be coded as follows:

Application-Instance-Information: =
⟨AVP Header: xxxx⟩[Report-Action]Set to No Action[QoS-Information]
100 Mbits/sec[Range-of-Instances]Set to 1-9
Application-Instance-Information: = ⟨AVP Header: xxxx⟩[Report-Action]
Set to Report Individually[Flow-Status]Set to
closed[Range-of-Instances]Set to 1-10-*(*indicates "all")

Step 1 of FIG. 10 corresponds to steps s2 and s4 of FIGS. 2a and 2b.

(step 2) TDF 300 installs the ADC rules provided by PCRF 100, and responds to PCRF 100, as illustrated by the arrow labelled "2. Reauthorization Response (RAA)".

(step 3) The user initiates a service instance as illustrated by the box labelled "3. User starts/modifies the service session, instance 1-9".

(step 4) TDF 300 detects the traffic related to that service (i.e. there is an active ADC rule for that service). It applies the actions required for instances 1-9. Since Report-Action indicates no report, TDF 300 does not inform PCRF 100. The bandwidth included within QoS-Information AVP for the range applies. This is illustrated by the box labelled "4. If Report-Action=No report, no traffic is generated. Apply the enforcement action applicable to that instance."

Steps 3 and 4 are repeated for the first nine detected service instances.

(step 5) TDF 300 detects the traffic related to the tenth service instance. in this case, Report-Action indicates "Report Individually". In this case, the Flow-Status indicates "closed" and thus the traffic related to this service instance and the subsequent ones should be blocked. This is illustrated by the box labelled "5. User modifies the service session, Instance 10".

(step 6) PCRF 100 is informed, as illustrated by the box labelled "6. If Report-Action=Report-Individually, the PCRF is informed. Apply the enforcement action applicable to that instance."

(step 7) The PCRF 100 responds back. New ADC rules may be provided. This is illustrated by the arrow labelled "7. Application Start Report (CCR): Event-Trigger: Application-Start. Application-Detection-Information (instance 10)".

(step 8) The PCRF 100 responds, as illustrated by the arrow labelled "8. Application Start Report Response (CCA)".

In this embodiment, the operator is thus able to adapt the operations to the specific needs. In this manner, no extra, unnecessary signalling is received by the PCRF and still PCC control is possible for the identified service instances. That is, the bandwidth for the first nine service instances will not exceed the operator demands. In the same manner, the PCRF is able to re-evaluate the policies once the tenth instance is detected.

Figure 11:
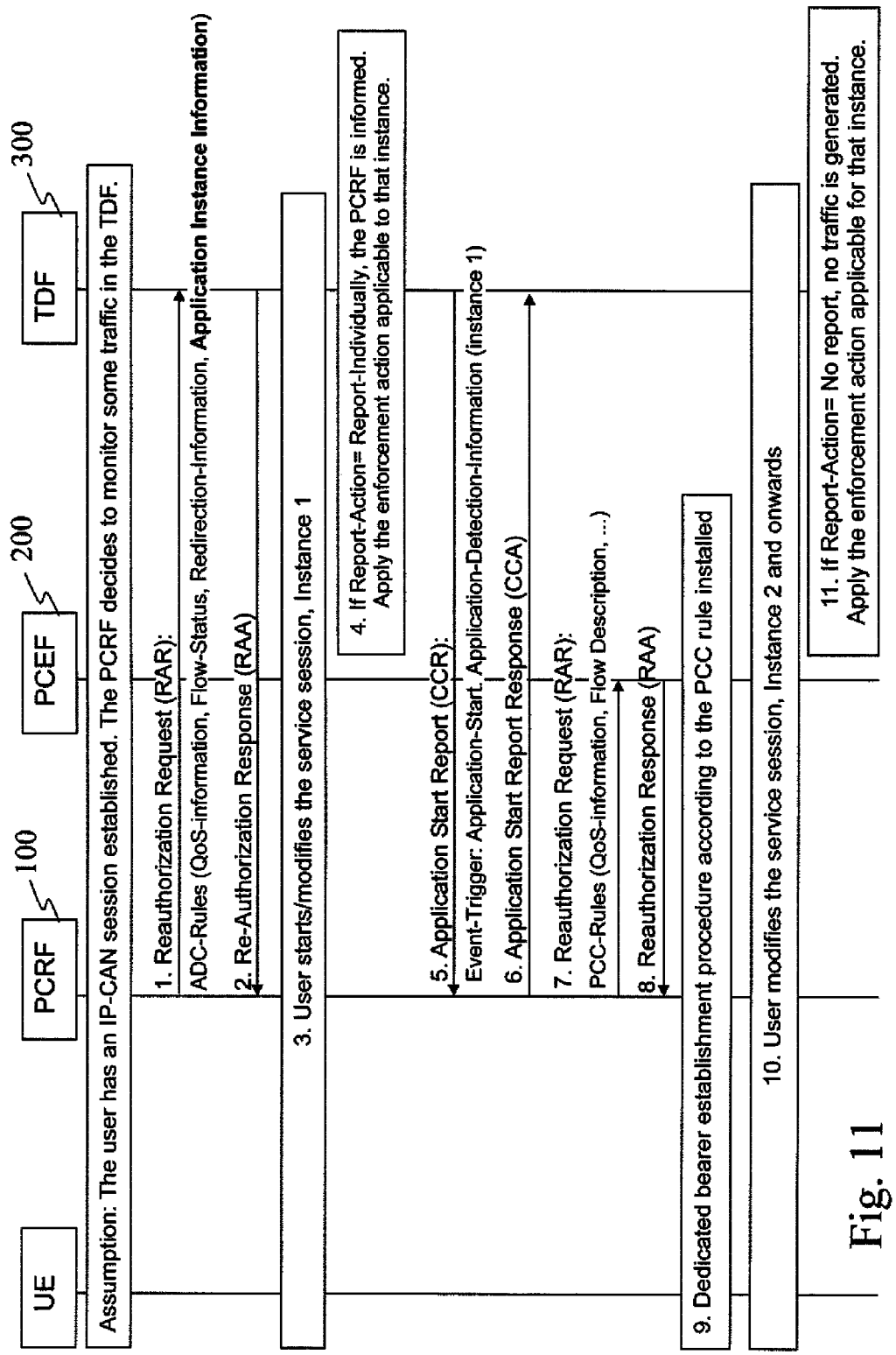
FIG. 11 is a message sequence chart schematically illustrating a method in one embodiment of the invention, involving a PCEF.

FIG. 11 is a flowchart of a method in one embodiment of the invention, involving: service detection performed in a TDF 300, and enforcement performed in a PCEF 200.

In this example, the operator wants to allocate a dedicated bearer only for the first service instance and block the rest of the service instances.

It is assumed that the user has a PDN connection established and thus an IP-CAN session is already established with the PCRF 100. Based on internal policies, PCRF 100 decides to monitor some traffic in TDF 300. This is illustrated on FIG. 11 by the box labelled "Assumption: The user has an IP-CAN session established. The PCRF decides to monitor some traffic in the TDF."

(step 1) PCRF 100 provides TDF 300 with the ADC rules that require monitoring in TDF 300 (ADC-Rule-Install AVP). As pail of this embodiment, PCRF 100 provides the Application-Instance-Information AVP within the ADC-Rule-Install AVP. This is illustrated on FIG. 11 by the arrow labelled "1. Reauthorization Request (RAR): ADC-Rules (QoS-information, Flow-Status, Redirection-Information, Application Instance Information)".

To do so, PCRF 100 provides, in the instruction, two instances of Application-Instanced-Information AVP. They may be coded as follows:

Application-Instance-Information:: = ⟨AVP Header: xxxx⟩[Report-Action]

Set to Report-Individually[Range-of-Instances]Set to 1-1

Application-Instance-Information:: =

⟨AVP Header: xxxx⟩[Report-Action]Set to No Report[Flow-Status]

Set to closed[Range-of-instances]Set to 2-* (*indicates "all")

Step 1 of FIG. 11 corresponds to steps s2 and s4 of FIGS. 2a and 2b.

(step 2) TDF 300 then installs the ADC rules provided by PCRF 100. This is illustrated by the arrow labelled "2. Re-Authorization Response (RAA)".

(step 3) The user initiates a service instance, as illustrated by the box labelled "3. User starts/modifies the service session, Instance 1".

(step 4) TDF 300 detects the traffic related to that service (i.e. there is an active ADC rule for that service). It applies the actions required for instance 1. Since Report-Action indicates Report Individually, TDF 300 informs PCRF 100. This is illustrated by the box labelled "4. if Report-Action=Report-Individually, the PCRF is informed. Apply the enforcement action applicable to that instance.", (step 5) TDF 300 informs PCRF 100, as illustrated by the arrow labelled "5. Application Start Report (CCR): Event-Trigger: Application-Start. Application-Detection-Information (instance 1)".

(step 6) PCRF 100 sends an acknowledgment to TDF 300, as illustrated by the arrow labelled "6. Application Start Report Response (CCA)".

(step 7) PCRF 100 generates and sends, to PCEF 200, a PCC rule for the service instance, including the QoS-Information, as illustrated by the arrow labelled "7, Reauthorization Request (RAR): PCC-Rules (QoS-information, Flow Description, . . . )".

(step 8) PCEF 200 sends an acknowledgment to PCRF 100, as illustrated by the arrow labelled "8. Reauthorization Response (RAA)".

(step 9) PCEF 200 according to the FCC rule information initiates a dedicated bearer establishment, as illustrated by the box labelled "9. Dedicated bearer establishment procedure according to the PCC rule installed".

(step 10) TDF 300 detects the traffic related to the second instance. This is illustrated by the box labelled "10. User modifies the service session, Instance 2 and onwards". In this case, Report-Action indicates "No Report". In this case, the Flow-Status indicates "closed" and thus the traffic related to this service instance and the subsequent ones are blocked.

(step 11) TDF 300 applies the blocking action locally without informing PCRF 100. This is illustrated by the box labelled "11. If Report-Action=No report, no traffic is generated. Apply the enforcement action applicable for that instance."

Therefore, some advantages of embodiments of the invention are as follows:

Reducing network signalling, avoiding unnecessary service instance notifications between PCEF/TDF and policy decision function (such as a PCRF).

Providing a mechanism to take individual actions on a per service instance or for a range of services instances.

Allowing the assignation of different level of QoS per service instance or range of service instances.

Providing a mechanism to allow the access to the first n service instances while blocking or redirecting the subsequent concurrent service instances.

Figure 12:
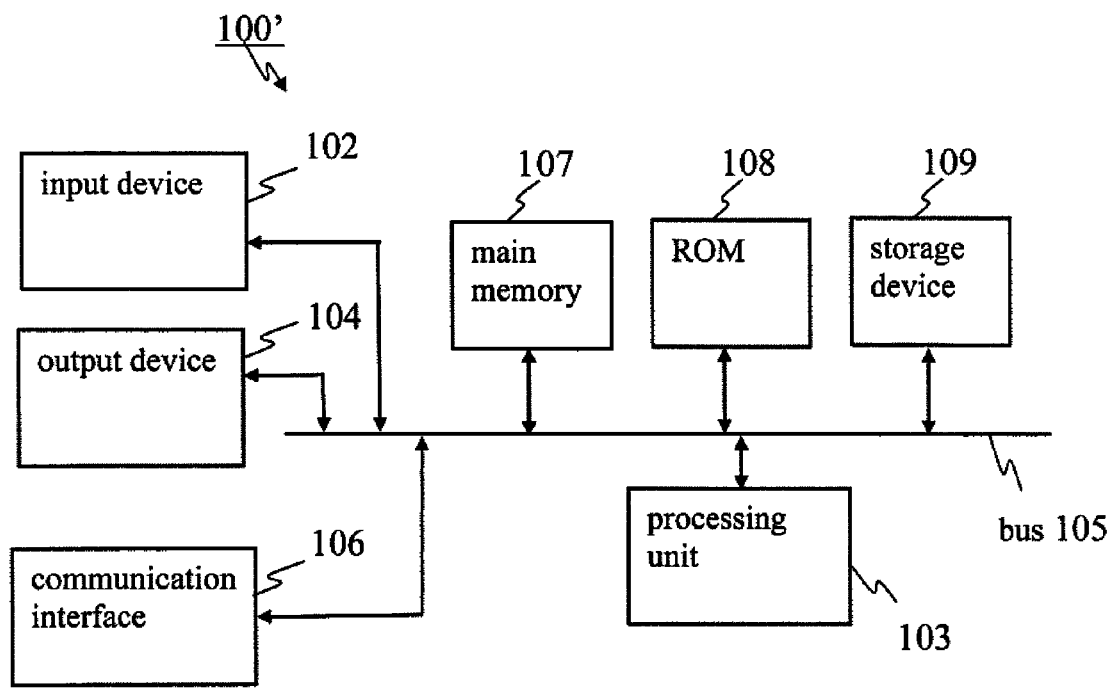
FIG. 12 is a schematic diagram of an exemplary implementation of a network node which may host a policy decision function according to one embodiment of the invention.

FIG. 12 is a schematic diagram of an exemplary implementation of a network node 100' that may host a policy decision function 100 (such as for example a PCRF) usable in embodiments of the invention. As illustrated, network node 100' may include a bus 105, a processing unit 103, a main memory 107, a ROM 108, a storage device 109, an input device 102, an output device 104, and a communication interface 106. Bus 105 may include a path that permits communication among the components of network node 100'.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator to input information to network node 100', such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables network node 100' to communicate with other devices and/or systems (such as with a PCEF or TDF). For example, communication interface 106 may include mechanisms for communicating with another device or system via a network.

Network node 100' may perform certain operations or processes described herein. These operations may be performed in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein, such as those characterizing the policy decision function 100. Alternatively, hardwired circuitry may be used in place of or in combination with software instructions to implement processes and/or operations described herein. Thus, implementations described herein are not limited to any specific combination of hardware and software.

Figure 13:
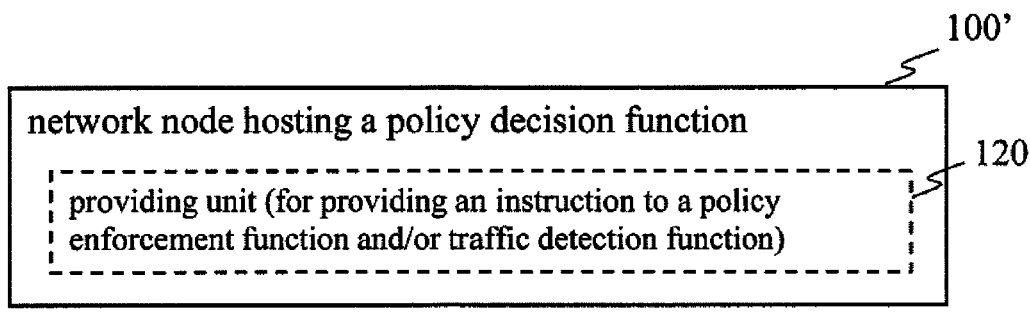
FIG. 13 schematically illustrates a network node hosting a policy decision function in one embodiment of the invention.

FIG. 13 schematically illustrates a network node comprising 100' hosting a policy decision function 100 in one embodiment of the invention. Such network node 100' may for example be implemented as illustrated on FIG. 12. Network node 100' comprises: a providing unit 120 configured for providing, to a policy enforcement function 200 and/or a TDF 300, an instruction. The instruction identifies at least one service instance of a service by the order according to which the service instance(s) of the service has been, have been, or may be started (i.e., the instruction identifies the service instance(s) by their starting order). The instruction also indicates (i) a service instance level reporting rule according to which policy enforcement function 200 and/or TDF 300 should report, or should abstain from reporting, information to policy decision function 100 after occurrence of an event relating to any one of the identified service instance(s), and/or (ii) a service instance level enforcement rule that policy enforcement function 200 and/or TDF 300 should enforce on a received packet relating to any one of the identified service instance(s).

Figure 14:
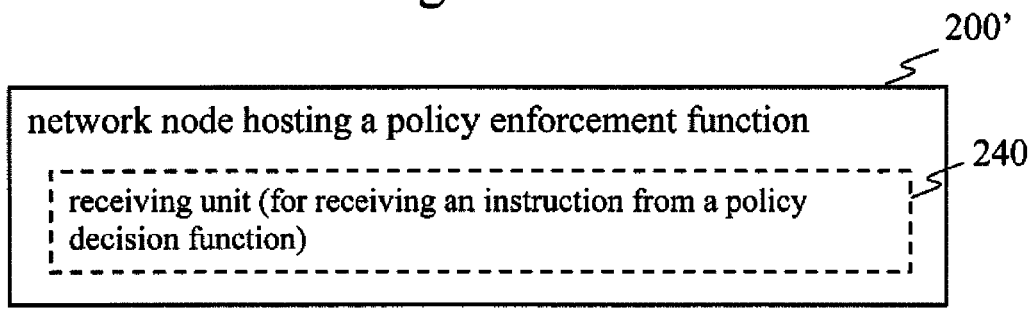
FIG. 14 schematically illustrates a network node hosting a policy enforcement function in one embodiment of the invention.

FIG. 14 schematically illustrates a network node 200' hosting a policy enforcement function 200 in one embodiment of the invention. Network node 200' may also for example be implemented as illustrated by FIG. 12. Network node 200' comprises a receiving unit 120 for receiving an instruction 50 from a policy decision function 100. The instruction and its function have been described above, for example with reference to FIG. 13.

Figure 15:
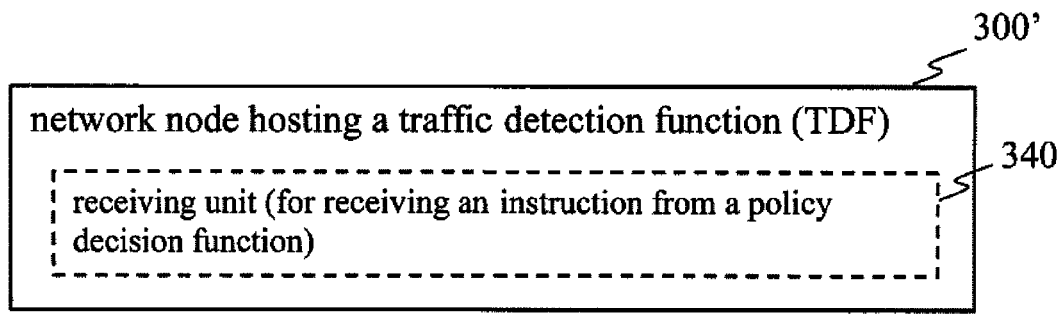
FIG. 15 schematically illustrates a network node hosting a TDF in one embodiment of the invention.

FIG. 15 schematically illustrates a network node 300' hosting a TDF 300 in one embodiment of the invention. Network node 300' may for example also be implemented as illustrated on FIG. 12. Network node 300' comprises a receiving unit 340 for receiving an instruction from a policy decision function 100. The instruction and its function have been described for example with reference to FIG. 13.

Figure 16:
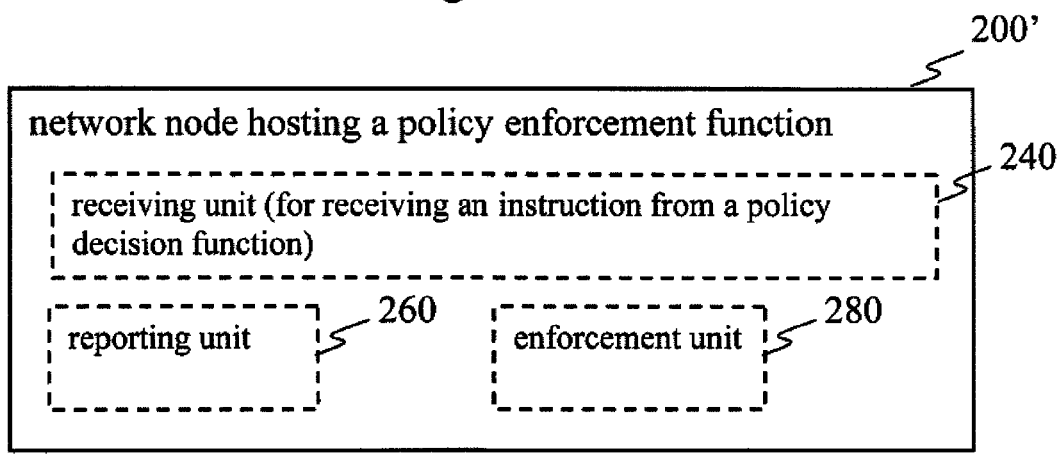
FIG. 16 schematically illustrates a network node hosting a policy enforcement function in one embodiment of the invention, which further includes a reporting unit and an enforcement unit.

FIG. 16 schematically illustrates a network node 200' which, compared to FIG. 14, further comprises a reporting unit 260 and an enforcing unit 280.

Reporting unit 260 is configured for reporting information to policy decision function 100 after the occurrence of an event by at least: (i) determining the service instance to which the event relates; (ii) if a service instance level reporting rule exists for the service instance, applying that service instance level reporting rule; and (iii) if a service instance level reporting rule does not exist for the service instance, applying a service level reporting rule existing for the service to which the event relates, or applying a default bearer reporting rule existing for the user terminal's connection to which the event relates.

Enforcement unit 280 is configured for enforcing rules on a received packet by at least: (i) determining the service instance to which the received packet relates; (ii) if a service instance level enforcement rule exists for the service instance, applying that service instance enforcement rule; and (iii) if an enforcement rule does not exist for the service instance, applying a service enforcement rule existing for the service to which the received packet relates, or applying a default bearer enforcement rule existing for the connection set up for the user terminal from which the received packet originates or to which the received packet is destined.

Figure 17:
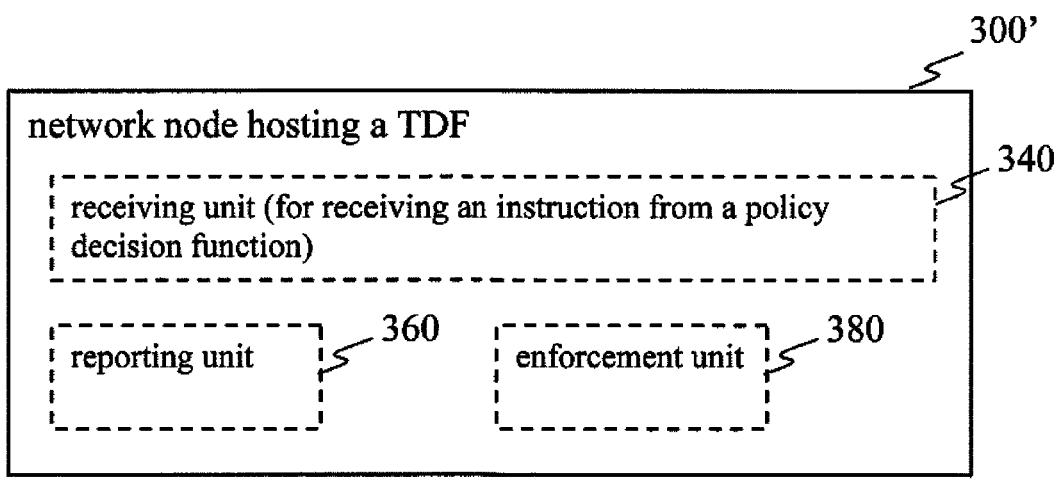
FIG. 17 schematically illustrates a network node hosting a TDF in one embodiment of the invention, which further includes a reporting unit and an enforcement unit.

FIG. 17 schematically illustrates a network node 300' hosting a TDF 300, which, compared to FIG. 15, further includes a reporting unit 360 and an enforcement unit 380. Reporting unit 360 and enforcement unit 380 are similar to reporting unit 260 and enforcing unit 280 already described with reference to FIG. 16.

Where the terms "providing unit", "receiving unit", "reporting unit", and "enforcement unit" etc. are used herewith, no restriction is made regarding how distributed these elements may be and regarding how gathered elements may be. That is, the constituent elements of a unit, function or network node may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned providing unit, receiving unit, reporting unit, and enforcement unit, etc. is replaced by providing means, receiving means, reporting means, and enforcement means, etc. respectively, for performing the functions of the providing unit, receiving unit, reporting unit, and enforcement unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method carried out by a policy decision function in a telecommunication network, the method comprising a providing procedure for providing, to at least one of a policy enforcement function and a traffic detection function, an instruction:
   identifying at least one service instance of a service, the at least one service instance of the service being identified in the instruction by the order according to which the at least one service instance of the service one of has been, have been and may be started; and
   indicating at least one of:
      (i) a service instance level reporting rule according to which the at least one of a policy enforcement function and a traffic detection function should one of report and not report information to the policy decision function after occurrence of an event relating to any one of the identified at least one service instance; and (ii) a service instance level enforcement rule that the at least one of a policy enforcement function and a traffic detection function should enforce on a received packet relating to any one of the identified at least one service instances the instruction further indicating at least one of:
a service instance level reporting rule according to which the at least one of a policy enforcement function and a traffic detection function should one of report and not report information to the policy decision function after occurrence of an event relating to the service, if there is no service instance level reporting rule applicable to the service instance to which the event relates; and a service level enforcement rule that the at least one of a policy enforcement function and a traffic detection function should enforce on a received packet relating to the service, if there is no service instance level enforcement rule applicable to the service instance to which the received packet relates.

2. The method of claim 1, wherein the instruction further indicates a default bearer reporting rule according to which the at least one of a policy enforcement function and a traffic detection function should one of report and not report information to the policy decision function after occurrence of an event relating to a connection set up for a user terminal, if there is neither a service instance level reporting rule applicable to the service instance to which the event relates nor a service instance level reporting rule applicable to the service to which the event relates.

3. The method of claim 1, wherein the instruction further indicates a default bearer enforcement rule that the at least one of a policy enforcement function and a traffic detection function should enforce on a received packet relating to a connection set up for a user terminal one of from which the received packet originates and to which the received packet is destined, if there is neither a service instance level enforcement rule applicable to the service instance to which the received packet relates nor a service level enforcement rule applicable to the service to which the received packet relates.

4. The method of claim 3, wherein the providing procedure is such that the instruction indicates:
for a first set of at least one service instance of a service, a first service instance level reporting rule applies;
for a second set of at least one another service instance of the service, a second service instance level reporting rule applies; and
the first service instance level reporting rule being different from the second service instance level reporting rule.

5. The method of claim 1, wherein the providing procedure is such that the instruction indicates:
for a first set of at least one service instance of a service, a first service instance level enforcement rule applies;
for a second set of at least one another service instance of the service, a second service instance level enforcement rule applies; and
the first service instance level enforcement rule being different from the second service instance level enforcement rule.

6. The method of claim 4, wherein:
n is an integer value such that n>1, with n indicating a number of service instances of the service; and
i is an integer value such that $1 \le i \le n$, with a different value of i being associated with each of the n service instances, the value i corresponding to the order according to which a service instance one of has been and may be established such that if the value i associated with a first service instance is smaller than the value i associated with a second service instance, the first service instance one of has been and may be started before the second service instance;
the first set comprises the service instances associated with values i=a to i=b, and
the second set comprises the service instances associated with values i=c to i=d,
wherein $a \ge 1$; $a \le b$; $b < c$; $c \le d$; and $d \le n$.

7. The method of claim 6, wherein at least one of the following applies:
(i) $a < b$ and $c \le d$;
(ii) $a \le b$ and $c < d$; and
(iii) $a < b$ and $c < d$.

8. The method of claim 7, wherein a=b=1; c=2; and d=n.

9. The method of claim 1, wherein the event is at least one of:
an initiation of a service instance;
a modification of a property of a service instance;
a termination of a service instance; and
a situation wherein an accumulated usage associated with a service instance has one of reached and exceeded a threshold.

10. The method of claim 1, wherein the enforcement rule relates to at least one of:
whether to one of enable and disable the forwarding of received packets;
whether to one of enable and disable the forwarding of received packets in the uplink direction;
whether to one of enable and disable the forwarding of received packets in the downlink direction;
which quality of service to apply to received packets;
which bit rate to use for forwarding received packets; and
whether to redirect received packets and, if so, to which address.

11. The method of claim 1, wherein the policy decision function is a policy and charging rules function (PCRF).

12. The method of claim 1, wherein the policy enforcement function is a policy and charging enforcement function (PCEF).

13. A method carried out by at least one of a policy enforcement function and a traffic detection function in a telecommunication network, the method comprising a receiving procedure for receiving, from a policy decision function, an instruction:
identifying at least one service instance of a service, the at least one service instance of the service being identified in the instruction by an order according to which the at least one service instance of the service one of has been, have been and may be started;
indicating at least one of:
(i) a service instance level reporting rule according to which the at least one of a policy enforcement function and a traffic detection function should one of report and not report information to the policy decision function after occurrence of an event relating to any one of the identified at least one service instance; and
(ii) a service instance level enforcement rule that the at least one of a policy enforcement function and a traffic detection function should enforce on a received packet relating to any one of the identified at least one service instance;

the instruction further indicating at least one of:
- a service instance level reporting rule according to which the at least one of a policy enforcement function and a traffic detection function should one of report and not report information to the policy decision function after occurrence of an event relating to the service, if there is no service instance level reporting rule applicable to the service instance to which the event relates;
- a service level enforcement rule that the at least one of a policy enforcement function and a traffic detection function should enforce on a received packet relating to the service, if there is no service instance level enforcement rule applicable to the service instance to which the received packet relates; and the method further comprising installing at least one rule indicated in the received instruction.

14. The method of claim 13, further comprising a reporting procedure for reporting, after the occurrence of an event, information to the policy decision function by at least:
- determining the service instance to which the event relates;
- if a service instance level reporting rule exists for the service instance, applying the service instance level reporting rule existing for the service instance; and,
- if a service instance level reporting rule does not exist for the service instance, one of applying a service instance level reporting rule existing for the service to which the event relates and applying a default bearer reporting rule existing for the user terminal's connection to which the event relates.

15. The method of claim 13, further comprising an enforcement procedure for enforcing rules on a received packet by at least:
- determining the service instance to which the received packet relates;
- if a service instance level enforcement rule exists for the service instance, applying the service instance level enforcement rule existing for the service instance; and,
- if a service instance enforcement rule does not exist for the service instance, one of applying a service level enforcement rule existing for the service to which the received packet relates and applying a default bearer enforcement rule existing for the connection set up for the user terminal from which the received packet originates or to which the received packet is destined.

16. A network node hosting a policy decision function, the network node comprising a providing unit configured for providing, to at least one of a policy enforcement function and a traffic detection function, an instruction:
- identifying at least one service instance of a service, the at least one service instance of the service being identified in the instruction by an order according to which the at least one service instance of the service one of has been, have been and may be started; and
- indicating at least one of:
  - (i) a service instance level reporting rule according to which the at least one of a policy enforcement function and a traffic detection function should one of report and not report information to the policy decision function after occurrence of an event relating to any one of the identified at least one service instance; and
  - (ii) a service instance level enforcement rule that the at least one of a policy enforcement function and a traffic detection function should enforce on a received packet relating to any one of the identified at least one service instances;

the instruction further indicating at least one of:
- a service instance level reporting rule according to which the at least one of a policy enforcement function and a traffic detection function should one of report and not report information to the policy decision function after occurrence of an event relating to the service, if there is no service instance level reporting rule applicable to the service instance to which the event relates; and
- a service level enforcement rule that the at least one of a policy enforcement function and a traffic detection function should enforce on a received packet relating to the service, if there is no service instance level enforcement rule applicable to the service instance to which the received packet relates.

17. A network node hosting at least one of a policy enforcement function and a traffic detection function, the network node comprising a receiving unit configured for receiving, from a policy decision function, an instruction:
- identifying at least one service instance of a service, the at least one service instance of the service being identified in the instruction by an order according to which the at least one service instance of the service one of has been, have been and may be started;
- indicating at least one of:
  - (i) a service instance level reporting rule according to which the at least one of a policy enforcement function and a traffic detection function should one of report and not report information to the policy decision function after occurrence of an event relating to any one of the identified at least one service instance; and
  - (ii) a service instance level enforcement rule that the at least one of a policy enforcement function and a traffic detection function should enforce on a received packet relating to any one of the identified at least one service instances the instruction further indicating at least one of:
- a service instance level reporting rule according to which the at least one of a policy enforcement function and a traffic detection function should one of report and not report information to the policy decision function after occurrence of an event relating to the service, if there is no service instance level reporting rule applicable to the service instance to which the event relates; and
- a service level enforcement rule that the at least one of a policy enforcement function and a traffic detection function should enforce on a received packet relating to the service, if there is no service instance level enforcement rule applicable to the service instance to which the received packet relates; and the network node being configured to install at least rule indicated in the received instruction.

18. The network node of claim 17, further comprising a reporting unit configured for reporting, after the occurrence of an event, information to the policy decision function by at least:
- determining the service instance to which the event relates;
- if a service instance level reporting rule exists for the service instance, applying the service instance level reporting rule existing for the service instance; and,
- if a service instance level reporting rule does not exist for the service instance, one of applying a service instance level reporting rule existing for the service to which the event relates and applying a default bearer reporting rule existing for the user terminal's connection to which the event relates.

19. The network node of claim 17, further comprising an enforcement unit configured for enforcing rules on a received packet by at least:
   determining the service instance to which the received packet relates;
   if a service instance level enforcement rule exists for the service instance, applying the service instance enforcement rule existing for the service instance; and,
   if an enforcement rule does not exist for the service instance, one of applying a service level enforcement rule existing for the service to which the received packet relates and applying a default bearer enforcement rule existing for the connection set up for the user terminal from which the received packet originates or to which the received packet is destined.

20. A computer program product comprising a computer program comprising computer-readable instructions configured, when executed on a computer, to carry out a method, the method comprising a providing procedure for providing, to at least one of a policy enforcement function and a traffic detection function, an instruction:
   identifying at least one service instance of a service, the at least one service instance of the service being identified in the instruction by an order according to which the at least one service instance of the service one of has been, have been and may be started; and
   indicating at least one of:
   (i) a service instance level reporting rule according to which the at least one of a policy enforcement function and a traffic detection function should one of report and not report information to the policy decision function after occurrence of an event relating to any one of the identified at least one service instance; and
   (ii) a service instance level enforcement rule that the at least one of a policy enforcement function and a traffic detection function should enforce on a received packet relating to any one of the identified at least one service instance; and
   the instruction further indicating at least one of:
   a service instance level reporting rule according to which the at least one of a policy enforcement function and a traffic detection function should one of report and not report information to the policy decision function after occurrence of an event relating to the service, if there is no service instance level reporting rule applicable to the service instance to which the event relates; and
   a service level enforcement rule that the at least one of a policy enforcement function and a traffic detection function should enforce on a received packet relating to the service, if there is no service instance level enforcement rule applicable to the service instance to which the received packet relates.

* * * * *